(12) United States Patent
Zhou et al.

(10) Patent No.: US 7,444,337 B2
(45) Date of Patent: Oct. 28, 2008

(54) FRAMEWORK AND ASSOCIATED APPARATUS FOR THE ADAPTIVE REPLICATION OF APPLICATIONS WITH SERVER SIDE CODE UNITS

(75) Inventors: Dong Zhou, San Jose, CA (US); Nayeem Islam, Palo Alto, CA (US)

(73) Assignee: NTT DoCoMo, Inc., Tokyo (JP)

( * ) Notice: Subject to any disclaimer, the term of this patent is extended or adjusted under 35 U.S.C. 154(b) by 438 days.

(21) Appl. No.: 10/797,772

(22) Filed: Mar. 9, 2004

(65) Prior Publication Data
US 2005/0203962 A1 Sep. 15, 2005

(51) Int. Cl.
G06F 17/30 (2006.01)
(52) U.S. Cl. .......................... 707/10; 707/201
(58) Field of Classification Search .............. 707/8, 707/10, 201, 103 R–103 Z; 709/203
See application file for complete search history.

(56) References Cited

U.S. PATENT DOCUMENTS

| | | | | |
|---|---|---|---|---|
| 6,823,356 B1* | 11/2004 | Novaes et al. | ............... | 709/201 |
| 2002/0056075 A1* | 5/2002 | Hamilton et al. | ............ | 717/110 |
| 2005/0114412 A1* | 5/2005 | Gerhard | ...................... | 707/204 |
| 2005/0198087 A1* | 9/2005 | Bremers | ..................... | 707/204 |

OTHER PUBLICATIONS

Java Serlets. http://java.sun.com/products/servlet/. Apr. 7, 2008. 1 page.
Cache Engine. http://www.cisco.com Apr. 7, 2008. 1 page.
CacheFlow. http://www.cacheflow.com (www.bluecoat.com) Apr. 7, 2008. 1 page.
Cao, P. and Irani, S., "Cost-aware WWW proxy caching algorithms," In Proc. USITS '97, pp. 193-206, Dec. 1997.
Cao, P., Zhang, J., and Beach, K., "Active Cache: Caching Dynamic Contents on the Web," Distributed Systems Engineering, 6(1): 43-50, 1999.
Endo, Y., Wang, Z., Chen, J.B., and Seltzer, M, "Using Latency to Evaluate Interactive System Performance," In Proc. OSDI '96. Oct. 1996.
Iyengar, A., McNair, E., and Nguyen, T., "An Analysis of Web Server Performance," In Proc. GLOBECOM '97, Nov. 1997.
Challenger, J., Iyengar, A., Dantzig, P., A Scalable System for Consistently Caching Dynamic Web Data. In Proc. Of IEEE INFOCOM '99. Mar. 1999.
Kroeger, T.M., Long, D.D.E., and Mogul, J.C., "Exploring the Bounds of Web Latency Reduction from Caching and Prefetching," In Proc. USITS '07, Dec. 1997.
Mogul, J.C., Douglis, F., Feldmann, A., and Krishnamurthy, B., Potential Benefits of Delta Encoding and Data Compression for HTTP. In Proc. ACM SIGCOMM (Sep. 1997), pp. 181-194.
Duska, B. M., Marwood D., Feely, M. J., "The Measured Access Characteristics of World-Wide Web Client Proxy Caches," Proceedings of the 1997 Usenix Symposium on Internet Technologies and Systems (USITS-97).

(Continued)

Primary Examiner—Cheryl Lewis
(74) Attorney, Agent, or Firm—Blakely, Sokoloff, Taylor & Zafman LLP

(57) ABSTRACT

A method and apparatus for adaptive replication of code units is described. In one embodiment, the method comprises gathering run-time capability and preference information for an application, client device and server regarding an application service object; and directing replication of at least one application service object from the server to the client device based on the client, the server, and the application run-time capability and preference information.

29 Claims, 21 Drawing Sheets

Gather run-time capability and preference information for an application, client device and server regarding an application service object — 101

Direct replication of at least one application service object from the server to the client device based on the client, the server, and the application run-time capability and preference information — 102

OTHER PUBLICATIONS

Traffic Server. http://www.inktomi.com. (acquired by Yahoo.com - redirected to http://sem.smallbusiness.yahoo.com/searchenginemarketing/index.php?abr=2022403519) Apr. 10, 2008. 1 page.

Xylomenos, G., Polyzos, G.C., and Mahonen, P., "TCP Performance Issues over Wireless Links," *IEEE Communications Magazine*, vol. 39, No. 4, pp. 52-58, Apr. 2001.

Gribble, S. D., and Brewer, E. A., "System Design Issues for Internet Middleware Services: Deductions from a Large Client Trace," *Proceedings of the USENIX Symposium on Internet Technologies and Systems*, Monterey, CA, Dec. 1997.

Crovella, M. and Bestavros, A., "Self-Similarity in World Wide Web Traffic: Evidence and Possible Causes," *Proceedings of the SIGMETRICS '96*.

Padmanabhan V. N., "Using Predictive Prefetching to Improve World Wide Web Latency," *Proceedings of the ACM SIGCOMM '96 Conference*.

\* cited by examiner

```
public AdaptationSuggestion serverConsult (RepletWrapper mervlet,
    ClientExtendedCPI cecpi, Object sessionID) {
    boolean useClientReplica = false;
    float confidence = 0.5f;
    float load = RepletProfiler.getLatestCPULoad();

if (load >= RepletPreference.cputLoadHighWaterMark) {
        useClientReplica = true;
        confidence = (load - RepletPreference.cpuLoadHighWaterMark) / load;
    } else
        confidence = (RepletPreference.cpuLoadHighWaterMark - load) /
            RepletPreference.cpuLoadHighWaterMark;
        return new AdaptationSuggestion (useClientReplica, confidence);
    }
```

FIG. 6

```
public class MyAdaptationConsultant implements AdaptationConsultant {
    Preference pref = mervlet.getPolicy ();
    Profiler profiler = mervlet.getProfiler ();
    boolean useClientReplica = false;
    float confidence = 0;

waitTimeThreshold = pref.getFloat ("WAIT_TIME_THRESHOLD");
    thrashingFactor = pref.getFloat("THRASHING_FACTOR");
    varianceThreshold = pref.getFloat ("VARIANCE_THRESHOLD");
    float clientServiceCost = profiler.estClientServiceCost ();
    float serverServiceCost = profiler.estServerServiceCost ();
    float transmissionCost = profiler.estTransmissionCost ();

if (mervlet.isActive()) {
        if (clientServiceCost < waitTimeThreshold) {
            useClientReplica = true;
            confidence = 1 - clientSeviceCost / waitTimeThreshold;
        } else {
            float syncCost = profiler.estSyncCost (sessionID);
            float tmp = syncCost + serverServiceCost + transmissionCost;
            if (tmp * thrashingFactor < clientServiceCost)
                confidence = 1 - tmp * thrashingFactor / clientServiceCost;
            else {
                useClientReplica = true;
                confidence = 1 - clientServiceCost / (tmp * thrashingFactor);
            }
        }
    } else {
        float waitTimeVariance = profiler.estWaitTimeVariance ();
        if (serverServiceCost + transmissionCost < waitTimeThreshold
            && waitTimeVariance < varianceThreshold)
            confidence = 1 - (serverServiceCost + transmissionCost) / waitTimeThreshold;
        else {
            float activationCost = profiler.estActivationCost (sessionID);
            if (!mervlet.isInstalled ()) activationCost += profiler.estInstallationCost();
            if (activationCost + clientServiceCost < waitTimeThreshold) {
                useClientReplica = true;
                confidence = 1 - (activationCost + clientServiceCost) / waitTimeThreshold;
            } else {
                float tmp1=transmissionCost + serverServiceCost;
                float tmp2 = (activationCost + clientServiceCost)
                    * thrashingFactor;
                if (tmp1 < tmp2) confidence = 1 - tmp1 / tmp2;
                else {
                    useClientReplica = true;
                    confidence = 1 - tmp2 / tmp1;
                }
            }
        }
    }
    return new AdaptationSuggestion (useClientReplica, confidence);
}
```

FIG. 7

```
// Get the preference derivation policy for Replet replication
DerivationPolicy dp = DerivationPolicy.get ("RepletReplication");

// find the user guideline
Guideline gline = new Guideline ("My guideline file");

// register myself as a "user", save the returned authentication code
long code = dp.register ("user", gline);

// get the derived preference
Preference pref = dp.getDerivedPreference ();

// change my wait threshold to 3 seconds, specify a priority of 5
// tell the meta policy that I'm the user, give the authentication code
pref.setGuidelineItem ("user", code, "waitThreshold", "3", 5);
```

FIG. 9

FRAMEWORK AND ASSOCIATED APPARATUS FOR THE ADAPTIVE REPLICATION OF APPLICATIONS WITH SERVER SIDE CODE UNITS

PRIORITY

The present patent application claims priority to the corresponding provisional patent application Ser. No. 60/480,583, entitled, "Framework and Associate Apparatus for the Adaptive Replication of Applications with Server Side Code Units" filed on Jun. 20, 2003, which is incorporated herein by reference.

A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

FIELD OF THE INVENTION

This invention relates to a mechanism for the user experience improvement of client/server style applications through dynamic selection and invocation of replicated server side code units.

BACKGROUND OF THE INVENTION

With the growing popularity of wireless Internet and the advance of mobile access technologies, Web applications are increasingly accessible for wireless devices such as cell phones, PDAs and WiFi-enabled laptops. Particularly, dynamic Web page generation techniques, such as Java Servlet and CGI, have become a trend to provide personalized Web pages and context-aware Web services to the wireless devices. However, traditional means of optimizing dynamic Web content generation and delivery are not well suited to the nature of unstable wireless connectivity. When a wireless client loses connection (either voluntarily or involuntarily) or roams into an area with weak connectivity, common optimization techniques, including static page prefetching, dynamic content caching data replication and content adaptation as well as application offloading, will fail to maintain effective interactive operations (e.g., querying account information, filling survey forms, calculating monthly payment for a loan) as they do not eliminate the need to go through the wireless connection for dynamically generated content.

Web caching and pre-fetching are important techniques for improving a user's Web experience. Most of the prior art, however, is targeted to static, non-personalized data. A few other systems, such as the Data Update Propagation (DUP) system, support the caching of dynamic data. DUP is a scheme that, using a graph, maintains data dependence information between cached objects and the underlying data that affect their values. Changes in underlying data trigger a graph traversal algorithm to determine the set of cached objects affected. The DUP scheme, however, is targeted for data used by a large number of users, and is less applicable to highly personalized web data.

Active Cache runs a cache applet for each document at the proxy server. The cache applet is used for pre-request processing for the document. Thus, Active Cache caches code for document generation or composition. Cached applets in Active Cache, however, are not server side code units. Rather, they are designed to run inside the proxy server. In addition, Active Cache does not address state consistency when the same cache applet is replicated on multiple proxy servers, nor does it allow a cache applet to dynamically choose to run on the Web server or on the proxy server.

Therefore, existing Web caching and pre-fetching techniques do not handle well the caching and pre-fetching of highly dynamic, highly personalized applications created using server side code units such as Servlets. One common characteristic of such applications is that seemingly identical tasks can exhibit different interaction sequences at different times or different users. For example, a user playing Web chess against a server gets a response different from the last one and different from other users playing against the same server. While approaches such as Delta-Compression can reduce the amount of data sent from the server to the client, a mobile user may still perceive poor application responsiveness. This is because concurrent execution of such server side code units may overload the server and prolong the service time for the request and because wireless networks tend to have longer round trip times and wider variation in connectivity than fixed-line networks. The combination of these two factors can result in a long delay and a wide variation in service response times and lead to poor user perceived service quality.

SUMMARY OF THE INVENTION

A method and apparatus for adaptive replication of code units is described. In one embodiment, the method comprises gathering run-time capability and preference information for an application, client device and server regarding an application service object; and directing replication of at least one application service object from the server to the client device based on the client, the server, and the application run-time capability and preference information.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 6 is an exemplary server-side adaptation suggestion generation code for an implementation of the adaptation helper.

FIG. 7 is the client side code of an exemplary adaptation helper implementation.

FIG. 9 is an exemplary code showing the usage of a preference management.

DETAILED DESCRIPTION OF THE PRESENT INVENTION

Figure 1:
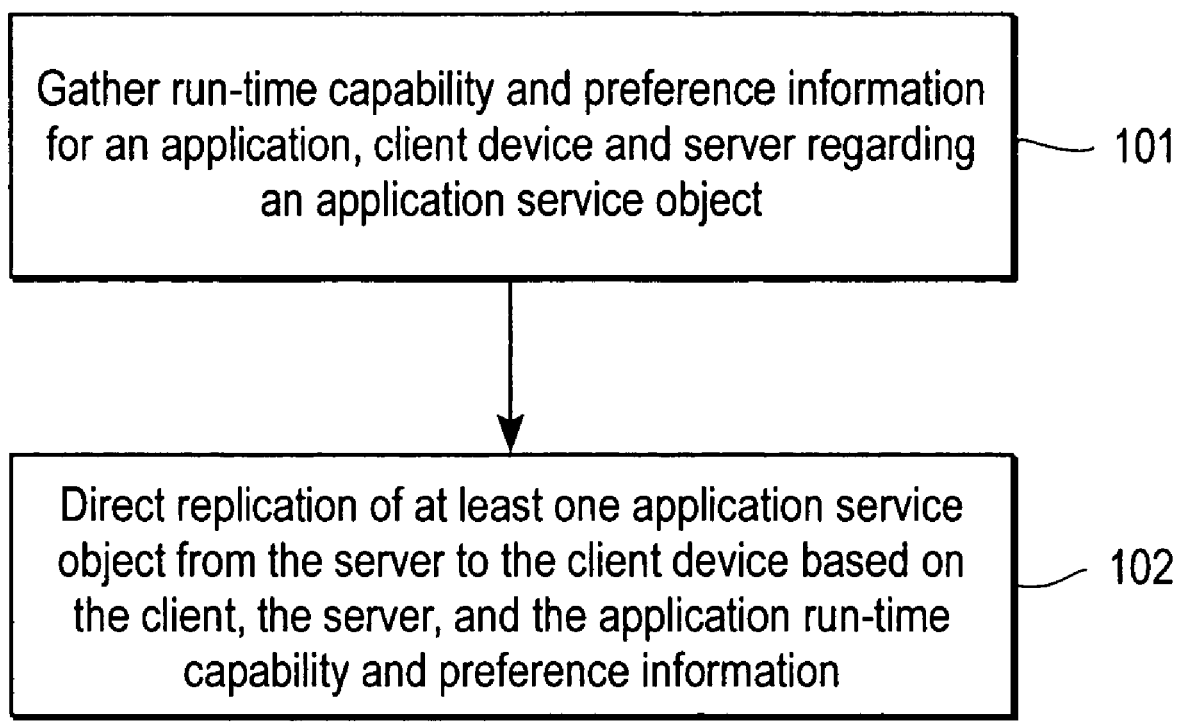
FIG. 1 is a flow diagram of one embodiment of a process for adaptive replication of applications with server side code units.

A technique for moving the execution of server side code units (along with their states) from a server to clients is described. This reduces the load on the server and eliminates the communication between the server and the clients. Because of the diversity in client device capabilities and the dynamics in server load and wireless connection conditions, embodiments of the present invention can correctly decide whether to execute the code units at the server or at the client, and dynamically change such decisions in accordance to the dynamics in load and connection conditions.

On-device service object replication is well-known in the art. For example, on-device service object replication is described as a mechanism for the client side execution of server side code units in A. Datta, K. Dutta, H. Thomas, D. VanderMeer, Suresha, and K. Ramamritham, *Proxy-based Acceleration of Dynamically Generated Content on the World Wide Web: An Approach and Implementation, in Proceedings of the* 2002 *ACM SIGMOD International Conference on Management of Data*, June 2002, which is incorporated herein by reference. Mervlets are server side code units that can conceptually migrated between the server and the client, and Mervlet Engines (MEs) run inside both server and client spaces, and support the execution of Mervlets. The following describes models and apparatuses that use Mervlets in one embodiment to enable the enhancement of mobile user experiences through adaptive Mervlet replication. Mervlets that can be replicated are referred to herein as replets.

In one embodiment, the replication involves replicating Web-related application logic to client devices. Such replication accommodates the divergence in resource availability for the client devices, supports applications that have different data sharing and coherency requirements, and accommodates the same application under different deployment environments.

In one embodiment, the replet system uses client, server and application capability and preference information (CPI) to direct the replication of service objects to client devices. The CPI may be used in the selection of a client device for replication and populating the client device with client-specific data, the selection of an appropriate replica to serve a given request, and the maintenance of the desired state consistency among replicas. One embodiment of the replet system exploits on-device replication to enable client-specific, server-specific and application-specific cost metrics for replica invocation and synchronization.

Embodiments of the on-device service object replication described herein adjust replication for one or more of divergent device compatibility, different application, user and server needs, and evolving environmental conditions.

Divergent device capability may include processor speed, available memory and power, and network bandwidth. A specific service object may be replicable to some devices but not to others due to different device capabilities. Conversely, a device may be able to replicate some service objects but not others.

Different application, user and server needs may include data consistency requirements and latency tolerance levels. For example, devices with different degrees of connectivity may require different degrees of data consistency or freshness. For example, a device with WiFi connection can subscribe to live streaming stock quotes, while a device with GPRS connection charged by number of packets may only need a refresh at the end of the day.

Evolving environmental conditions may include changing connectivity or changing server load. For example, a device moving between good and bad connection may want to change its choice of caching strategies, and a server under changing load condition may adjust limits on clients' access rates.

In the following, a replet system for customizing and dynamically adapting the replication of application service objects to client devices is described. The replet system includes a mechanism for the client devices, the application and the server to specify their preferences and expressing runtime capability. The preference and capability information from different entities might be conflicting or overlapping. For instance, the current server load and the behavior of clients can yield different preferences in tolerable latency for service responses. The replet system gathers preferences and capability information from different entities, combines them, and resolves any conflicts among them.

FIG. 1 is a flow diagram of one embodiment of a process for adaptive replication of applications with server side code units. The process is performed by processing logic that may comprise hardware (e.g., circuitry, dedicated logic, etc.), software (such as is run on a general-purpose computer system or a dedicated machine), or a combination of both.

Referring to FIG. 1, the process beings by processing logic gathering run-time, capability and preference information for an application, client device, and a server regarding an application service object (processing block 101).

Next, processing logic directs replication of at least one application service object from the server to the client device based on the client, the server, and the application runtime capability and preference information (processing block 102).

Preference and capability services provide the foundation for the customizability and adaptability of the replication process of replets. In one embodiment, the invocation of a replet involves decision objects using runtime capability information to decide, for each service request, whether to invoke Web-related application logic replicated on the device, or its counterpart on the server. Such decision objects, such as a Client-side Invocation Helper (CIH) and Server-side Invocation Helper (SIH), are defined through preferences and thus can come from the client device, the server, or the application. An exemplary CIH may be a decision object that chooses the replica with lower estimated response time between invoking a client device replica and a server replica, and an exemplary SIH may be a decision object that always chooses the server replica unless a server load threshold is exceeded.

Similarly, in one embodiment, the synchronization of application data in the replet system involves querying a Synchronization Helper (SH) acquired from preferences to determine when to synchronize application data replicated on a client device with the copy residing on the server, and whether to lock a server copy of the application data to ensure sequential access. An exemplary SH may be one that suggests synchronizing data only when no such synchronization has been performed for a period of time (e.g., for that day or week).

The use of replets and the replete system addresses the divergent device capability problem as it uses device capability information and application characteristics to guide the selection of devices for replication, as well as addressing different application, server and user needs by allowing each of them to specify customized invocation and synchronization strategies. Moreover, the replet system addresses the evolving environmental condition issue by profiling runtime capabilities to dynamically guide the invocation and synchronization processes to adapt to environment changes.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Overview of an Exemplary Replet System

The Replet Model

The replet model is applicable to applications that utilize server side code units. In one embodiment, the replet model is based on the Servlet Web server extension technology. In this embodiment, a replet can be considered as a servlet with extensions for mobility and replication. A replet is a replicable object and is part of a replicable service deployed on a server. A replicable service consists of one or more replets and, optionally, other non-replicable objects. Each replet of a replicable service represents one service interface of the replicable service. A replet handles the requests from clients and generates results for these requests. Each replet can have multiple replicas, one of which is a primary replica (or a server replica) that resides on the server, while others reside on client devices (henceforth a client replica). Intuitively, a replet is similar as a usual service object such as a Servlet (see Sun Microsystems, Inc. Java Servlet Technology. http://java.sun.com/products/servlet/), except that it can be copied to client devices and serve requests locally.

A replet runs inside a replet engine (or RE, which is replet engine with replication support) much as a servlet runs in a servlet container. A replet engine invokes service engines. A difference, however, is that a replet or a group of replets that make up an application (e.g., a Web-based application) can be transferred or copied from one RE to another in order to better serve the applications that access the replets. Each replet has an owner RE similar to a servlet having a hosting server. In one embodiment, a replet, however, can exist and run in REs other than its owner RE. The client of an application can retrieve the replets used by the application from the server side and store these replets locally. When the application invokes one of the replets, the stored copy can be invoked instead of the original copy at the server's side.

In one embodiment, a replet has three components: the classes, the read-only data, and the mutable states. The mutable states include transient states as well as persistent states. The process of installation makes the classes and read-only data of the replet available at the intended host. Such classes and data can either be preloaded before the application is started, loaded in entirety when the client replica is installed, or be installed individually when demanded. Such classes and data can be cached until space is needed for other applications.

Figure 2:
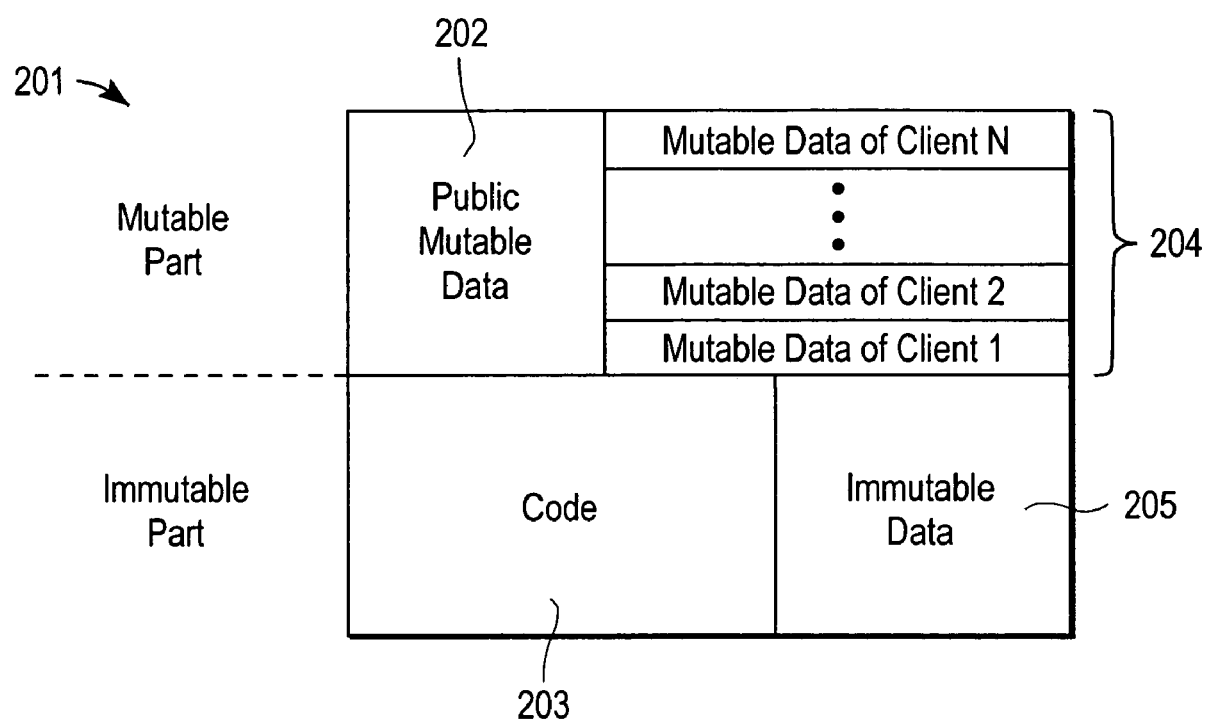
FIG. 2 illustrates a replete server replica

FIG. 2 illustrates a replete server replica. Referring to FIG. 2, a replet replica 201 is explicitly divided into code 203, immutable data 205, and mutable data 202 and 204. In one embodiment, code 203 includes the class files that define Web-related application logic and is identical for all replicas of the same replet. However, the mutable data 202 and 204 and immutable data 205 (which can be a combination of in-memory objects, files and mobile database tables with records and attributes tailored to client's needs) of a specific client replica can be different from that of a server replica or other client replicas. For example, a client replica can have rows of a database table filtered out, which are different from another client replica. Mutable data 202 and 204 of a replica, which can be modified by clients, is further divided into a public fragment (202) and a private fragment (204). The public fragment (202) is shared by a number of clients, thus is accessible to the server replica and the client replicas on those clients. The private fragment (204) is specific to a client and is only accessible to the client replica and its server replica.

In one embodiment, a client replica on a client device is different in that it only has the private mutable data for that given client.

Figure 3:
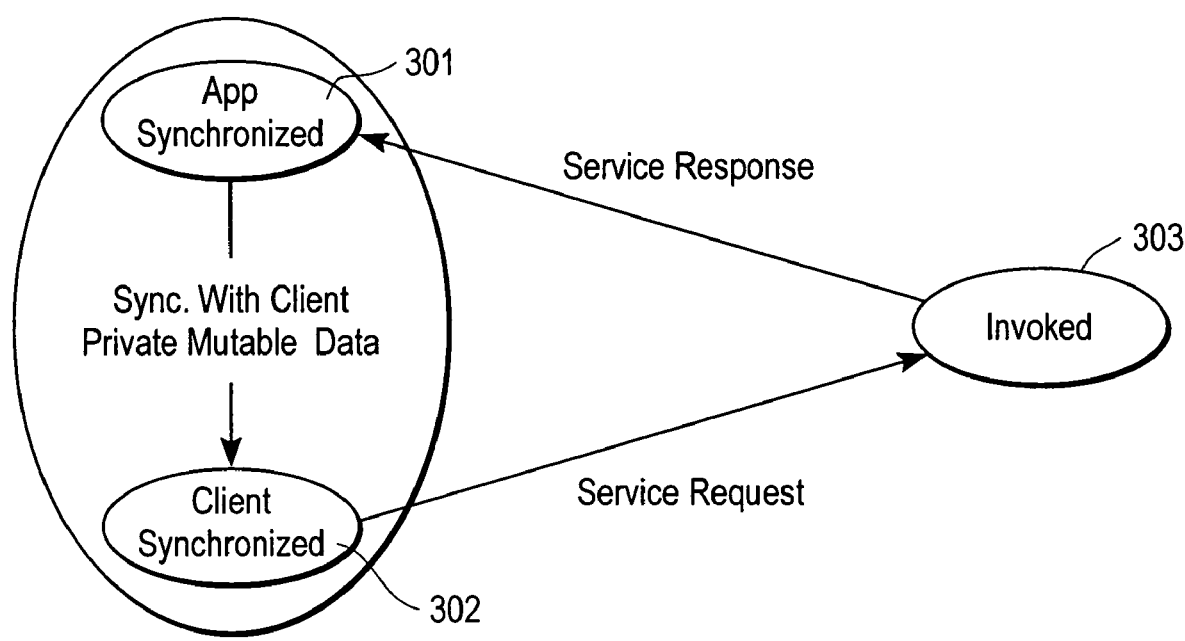
FIG. 3 is a state transition diagram of one embodiment of a server replica.

FIG. 3 is a state transition diagram of one embodiment of a server replica. At a given moment, for a given client, a server replica can be in one of following three states, namely app-synchronized state 301, client synchronized state 302, and invoked state 303.

In app-synchronized state 301, the server replica has up-to-date public mutable data, but does not have up-to-date private mutable data for the client; the server replica transitions into app-synchronized state 301 from invoked state 303 in response to a service response.

In client-synchronized state 302, the server replica has synchronized copies of both public mutable data and the private mutable data for that given client. The server replica transitions to client-synchronized state 302 from app-synchronized state 301.

In invoked state 303, the server replica was in client-synchronized state 302 and has been selected to serve a request from the client, and the invocation is in the process. Thus, the server replica transitions into invoked state 303 from client-synchronized state 302 in response to a service request.

Note that a server replica can be in client-synchronized state 302 for one client, but in app-synchronized state 301 for another.

Figure 4:
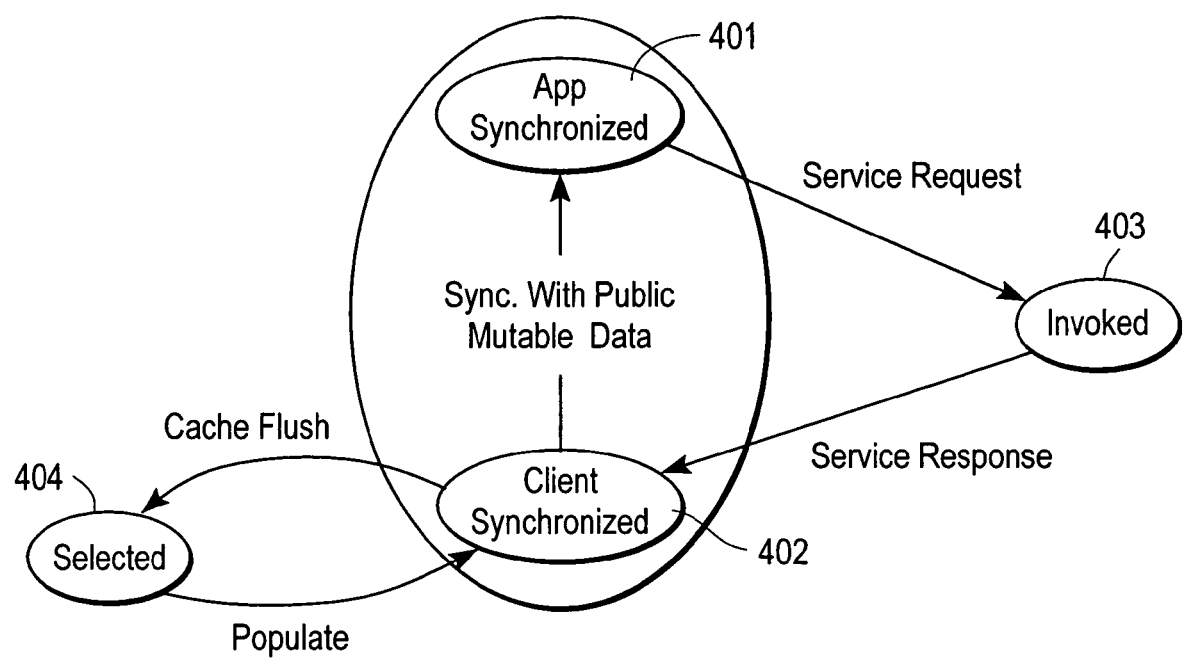
FIG. 4 illustrates a state transition diagram for one embodiment of a client replica.

In one embodiment, a client replica has an additional selected state, in which the replica has not yet been populated with code and data, or the code and data have been removed to allow the replication of other applications. FIG. 4 illustrates a state transition diagram for one embodiment of a client replica. Note that after invocation, a server replica transitions into app-synchronized state 301 (from invoked state 303), while a client replica transitions into client-synchronized state 402 (from invoked state 403) in response to a service response.

Referring to FIG. 4, the client replica transitions from app-synchronized state 401 to invoked state 403 in response to a service request. The client replica transitions from invoked state 403 to client-synchronized state 402 in response to a service response. The client replica moves from client-synchronized state 402 to app-synchronized state 401 when synched with public mutable data.

While in client-synchronized state 402, the client replica may transition to selected state 404 in response to a cache flush. The cache flush is issued to cause deactivation of the client replica. Once in selected state 404, the client replica transitions to client-synchronized state 402 in response to being populated with data, as will be described in more detail below.

Figure 5:
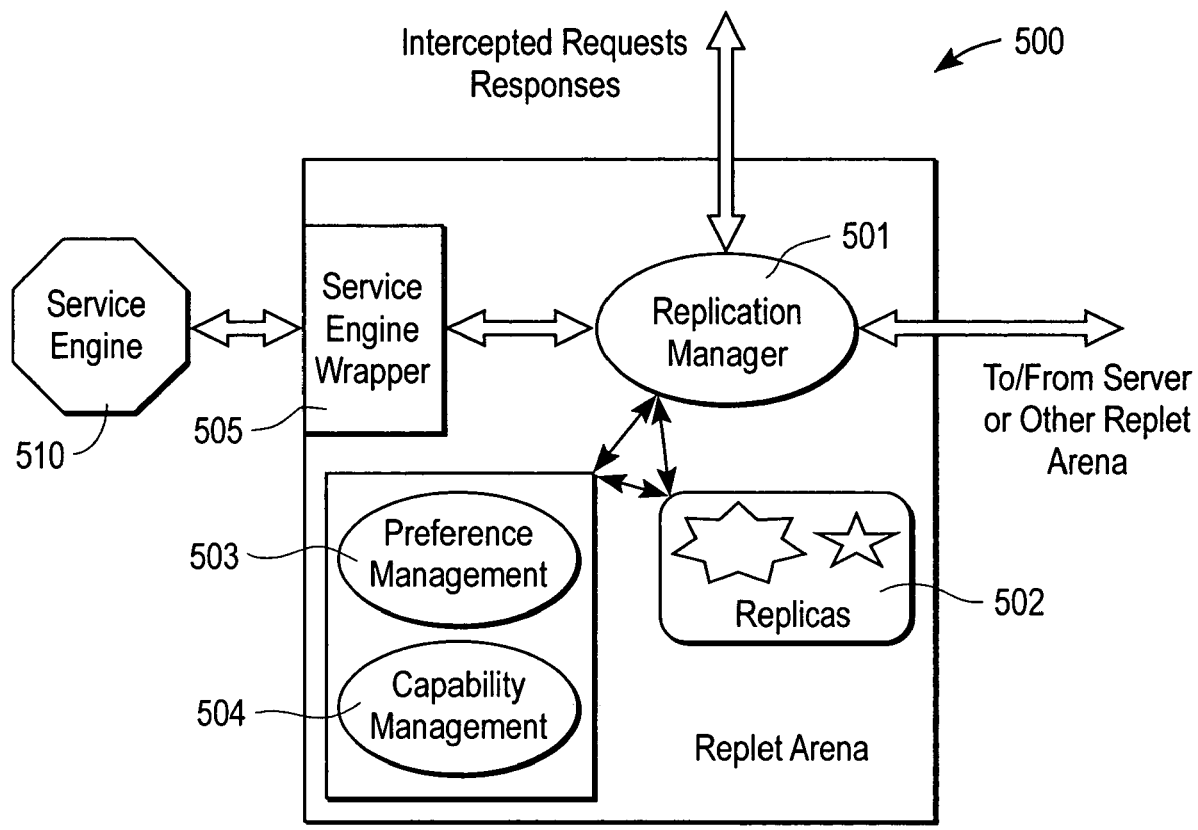
FIG. 5 illustrates one embodiment of a replete arena.

Replicas of replets live inside replet arenas. FIG. 5 illustrates one embodiment of a replete arena. A replet arena is a runtime environment for replicas of different applications. A replica in an arena can either be the server replica of an application or a client replica of the application.

Referring to FIG. 5, replet arena 500 comprises the following components: a service engine wrapper 505; preference manager 503 and capability manager 504; and the replication manager 501.

Service engine wrapper 505 implements a service engine interface to service engine 510 (e.g., a Servlet server such as Tomcat) and is the delegate for the external service engine chosen by replet arena 500. The service engine interface of service engine wrapper 505 defines methods for deploying and removing a service, and for obtaining a service container for a particular service request to serve the request. While, in one embodiment, the service engine interface is identical for all replet arenas, different arenas use different service engine wrappers when they employ different service engines. For example, one replet arena running on a desktop computer could use the service engine wrapper for Jakarta Tomcat (see Apache Software Foundation. The Apache Jakarta Project. http://jakarta.apache.org/tomcat/), while another running on a PDA could use the wrapper for Jetty (see Jetty:// Web Server & Servlet Container. http://jetty.mortbay.com/jetty/index.html) that can be configured to less than 300 KB.

Preference and capability management, with their respective managers 503 and 504, provide information used by replication manager 501 to direct the process of replication: from the selection of a client device for replication, and populating the device with code and data, to synchronizing replicas and choosing a synchronized replica for serving a request.

Capability and Preference Management

A replet uses capability and preference information to direct the process of replication. Capability is some system comprises status information gathered or estimated at the runtime, such as, for example, available memory and the response time estimation. A preference is a set of properties. Preference information consists of preferences pre-specified by the application server, the user, or the application, such as, for example, the required memory and the preferred response time. Comparing preference and capability information, the replet manager can determine which replica to use or whether to download a replica from the server.

Preference Management

A preference is defined and used by multiple parties. In one embodiment, three participating entities, also called roles, take part in preference derivations: the client, the server and the application. A role represents a set of entities that are intended to be assigned identical access rights of the preference. The entities often have conflicting or overlapping preferences. For example, an impatient user wants to get the results in 10 seconds while the application estimates the acceptable response time to be within 15 seconds. Preference management performed by a performance manager merges potentially conflicting partial preferences from different roles into a unified global preference. Note that, in one embodiment, replication manager 501 acts as a preference manager.

A preference is generated by resolving the conflicts among the guidelines of a preference derivation policy. The preference derivation policy defines a set of roles, with each role having a guideline and a maximum precedence. The guideline for each role is set to pre-defined value when the derivation policy is created, and such guideline can be changed later.

A guideline is a set of guideline items. A guideline item is a <property, precedence> pair, where precedence is a number. Specifically, for each property name N, there could be multiple guidelines that each contains a guideline item with the same property name. Among these guideline items, the one with the highest valid precedence is selected and its property is put into the preference. A valid precedence of a guideline item GI from guideline G is the smaller of the maximum precedence of G and the specified precedence of GI.

In one embodiment, when a preference derivation policy is created, for each role, a secret identifier (implemented as a 64-bit integer) chosen by the application is stored in the preference derivation policy. This identifier is used for access control, that is, the preference derivation policy can be accessed only when the proper identifier is supplied.

Preference can be changed at runtime, by either replacing the guideline of a role in the derivation policy, or by adding/replacing an item of a guideline. In the former case, a new preference derivation process exactly as described above will result in a new preference. In the latter case, the derivation will only happen to that specific preference item.

Other components of the system can register as the listeners of changes in a preference, so that when a preference is reconfigured, these interested parties will be notified and given the chance to react to the changes. This is one of the foundations of reconfigurability in the system.

Capability profilers exchange profiling information. A special property in an adaptive replication preference is the HELPER property. The value of this property is an object whose class implements the helper interface. A helper is an object that can help the system make decisions at runtime. Each helper implements an interface method with profiling data, policy, and the replet as parameters, and returns a suggestion, and the confidence of this suggestion, for different decision types. An adaptation helper returns the suggestion regarding using the client or server replica for the service request. FIG. 6 shows sample server-side adaptation suggestion generation code for an implementation of the server-side invocation helper. FIG. 7 shows the client side code of the sample adaptation helper implementation.

Figure 8:
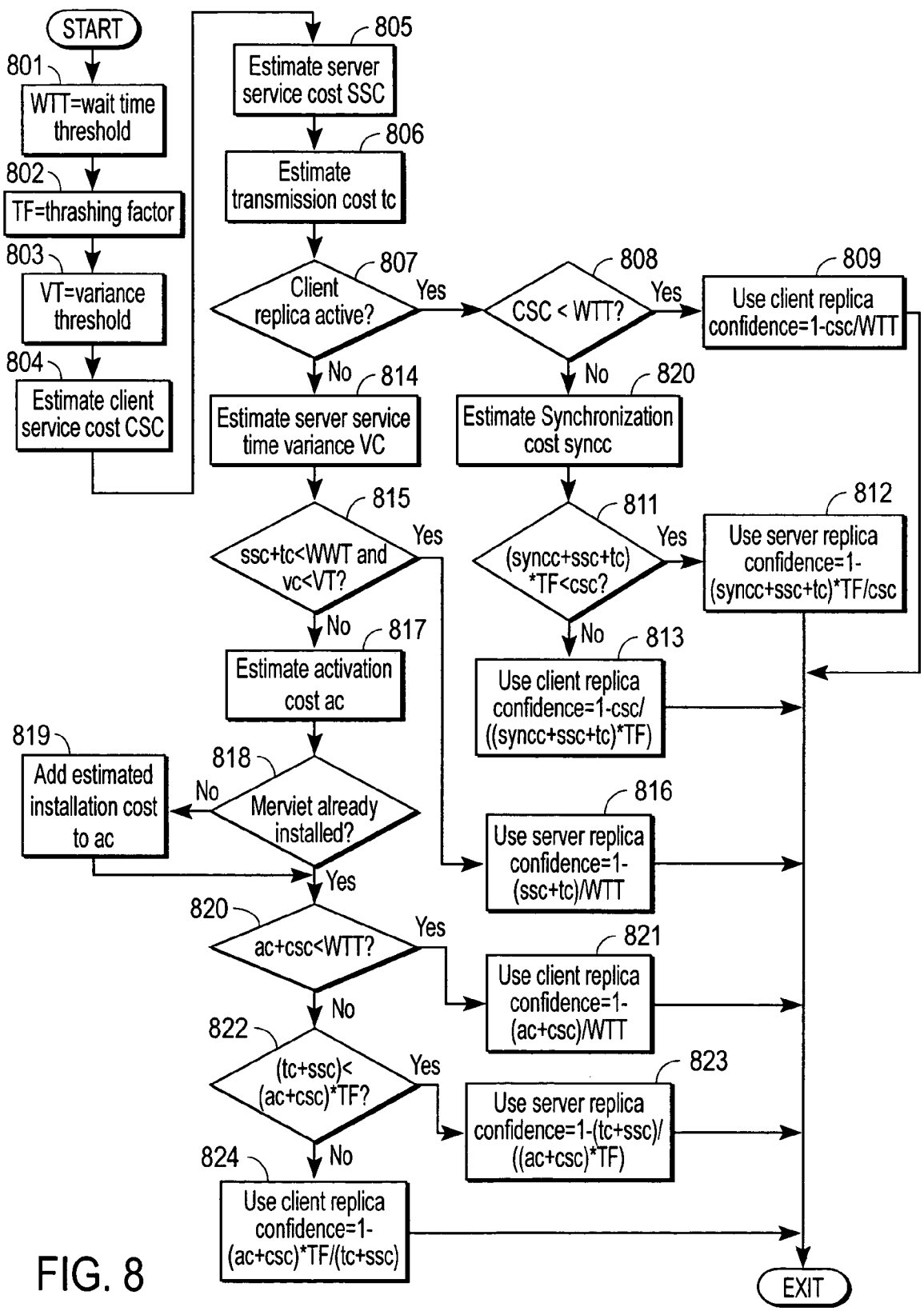
FIG. 8 is the flowchart of one embodiment of an adaptation helper implementation.

FIG. 8 shows the flowchart of the sample adaptation helper implementation. The adaptation helper implementation is implemented with processing logic which may comprise hardware (e.g., circuitry, dedicated logic, etc.), software (such as is run on a general-purpose computer system or a dedicated machine), or a combination of both. Referring to FIG. 8, after processing logic initializes the wait time threshold, (processing block 801), a thrashing factor (processing block 802) and a variance threshold (processing block 803), processing logic estimates the client service cost (processing block 804). After estimating the client service cost, the processing logic estimates the server service cost (processing block 805). Then the processing logic estimates the transmission costs (processing block 806).

Then processing logic determines whether the client replica is active (processing block 807). If the client replica is active, processing transitions to processing block 808 where processing logic tests whether the client service cost is less than the wait time threshold. If it is, processing logic uses the client replica with the confidence of equal to one minus the client service cost divided by the wait time threshold, and the process ends.

If the client service cost is not less than the wait time threshold, processing logic estimates the synchronization cost (processing logic 810) and then tests whether the synchronization cost plus the server service cost plus the transmission cost times the thrashing factor is less than the client service cost (processing block 811). If it is, processing logic uses the server replica with a confidence factor equal to one minus (the synchronization cost+the server service cost plus the transmission cost)×(the thrashing factor) divided by the client service cost (processing block 812), and the process ends. If not, then processing logic transitions to processing block 813 where the processing logic uses the client replica with the confidence equal to the same, and thereafter the process ends.

If the client replica is not active, processing logic estimates the server service time variance (processing block 814) and then determines whether the server service costs plus the transmission costs is less than the wait time threshold and the server service time variance is less than the variance threshold (processing block 815). If it is, then processing logic transitions to processing block 816 where processing logic uses a server replica with a confidence equal to one minus (the server service costs plus the transmission cost) divided by the wait time threshold, and then the process ends. If not, processing logic transitions to processing block 817 where the processing logic estimates the activation costs.

After estimating the activation cost processing logic determines whether the Mervlet is already installed (processing block 818). If it is not, processing logic adds the estimated installation cost to the estimated activation cost (processing block 819) and transitions to processing block 820. If the Mervlet is already installed, processing logic also transitions to processing block 820. In processing block 820, processing logic tests whether the estimated activation cost plus the client service cost is less than the wait time threshold. If it is, processing logic uses the client replica with a confidence equal to one minus (the activation cost plus the client service cost) divided by the wait time threshold (processing block 821), and the process ends. If not, processing logic tests whether the transmission cost plus the server service cost is less than the estimated activation cost plus the client service cost multiplied by the thrashing factor (processing block 822). If so, processing logic transitions to processing block 823 where the processing logic uses the server replica with a confidence equal to one minus (the transmission cost plus the server service cost) divided by the product of (the estimated activation cost plus the client service cost) multiplied by the thrashing factor, and the process ends. If not, processing transitions to processing block 824 where the processing logic uses the client replica with a confidence equal to 1 minus (the activation cost plus the client service cost) multiplied by the thrashing factor divided by the result of adding the transmission cost to the server service cost, and the process ends.

Sample code showing the usage of the preference management is in FIG. 9.

In one embodiment, there are two versions of replet replication preference for each replica of a replet: a server side version and a client side version. Initially, the server side has the server host guideline and the application guideline, while the client has the client host guideline and the user guideline. When the client requests for the applications, it exchanges the client user guidelines with the server side application guideline, so that each side has a "host" guideline, a "application"

guideline and a "user" guideline, and a runtime policy can be derived from these guidelines.

Figure 10:
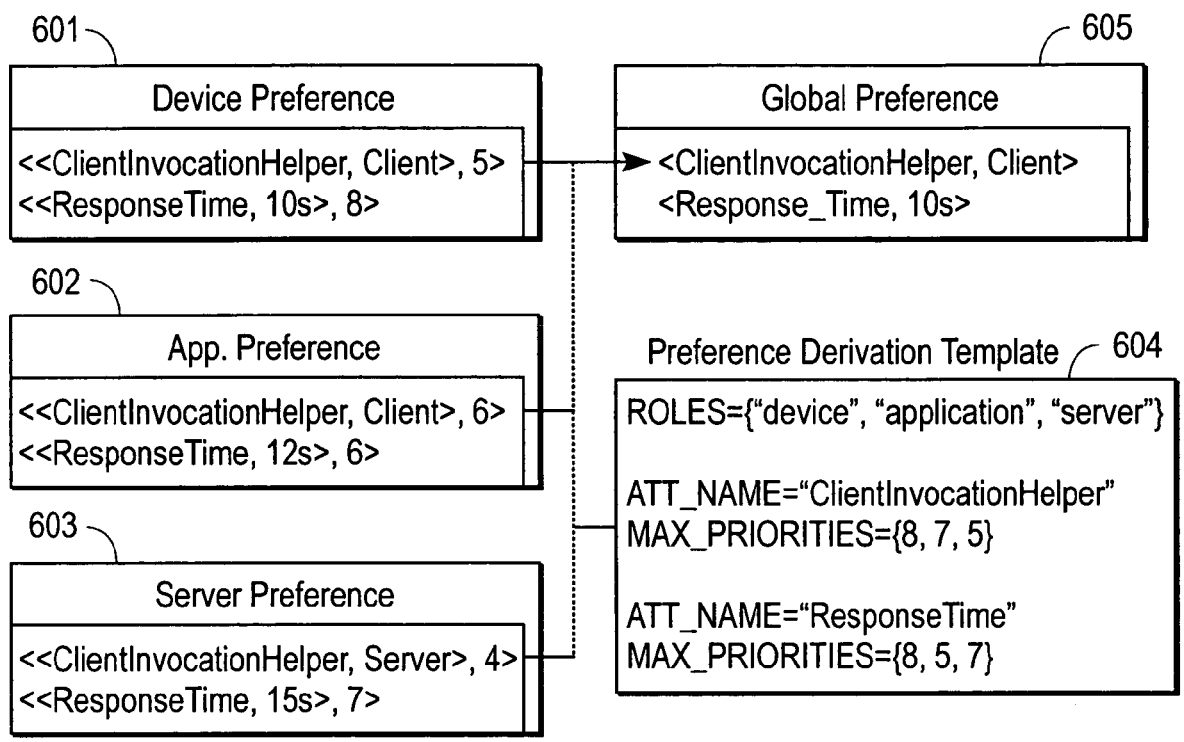
FIG. 10 illustrates one embodiment of preference management.

FIG. 10 may be used to illustrate how preference management works according to one embodiment. Each entity specifies a partial preference that consists of a set of partial properties. In one embodiment, a partial property is a <property, precedence> pair, where the property is a property, and precedence is a number denoting priority. Each property is a <name, value> pair, where name is a string and value can be an arbitrary object. For instance, <<ResponseTime, 10s>, 8> in device preference 601 means that the device preferred response time should be within 10 seconds with a precedence level of 8.

In order to derive a global preference, a preference derivation policy is used. In one embodiment, the preference derivation policy is implemented with a performance derivation template. Referring back to FIG. 10, each partial property (a property of either the user, application, or server) is first validated with a preference derivation template 604. Preference derivation template 604 sets maximum priority levels for each partial property. If a partial property contains a precedence value higher than the maximum level specified in the template, the partial property is considered invalid. For example, ResponseTime in application preference 602 is invalid because its precedence (i.e., 6) exceeds the maximum priority (i.e., 5).

Afterwards, valid properties are merged into global preference 605. In one embodiment, if there are conflicting properties, only those with higher precedence values are kept. For example, there are two valid ResponseTime properties specified in device preference 601 and server preference 603 respectively. The one in the device preference 601 is kept because its precedence value (i.e., 8) is higher.

In one embodiment, the preference manager provides a mechanism for devices, servers and applications to jointly configure and reconfigure service object runtime, to allow devices and servers to control the behaviors of applications, and to allow the exchange of preferences between two service object runtimes.

Capability Management

A replet arena's capability service maintains capability and profiling information of the client, the server, and the application. The capability information is maintained by a capability profiler. A capability profiler that acts as a sensor of device capability and environment and application conditions (such as, for example, synchronization costs), and predicts the processing and overall response time of service requests.

Client capabilities include, for example, the amount of memory or storage available on the device, its CPU processing power, the availability of a just-in-time compiler, downlink and up-link bandwidth, and the round-trip time to the server. A server's capabilities include its CPU processing power and its load. Application profiling data includes storage and memory requirement on some typical device types, the range of costs for processing requests on several typical devices, observed responses time for requests, the current number of client replicas for the replet, as well as the application's requirement for the software environment (such as requiring a specific JAR file).

Some of such capabilities or characteristic data (such as, for example, installed memory) are static, while others (such as, for example, current server load) are dynamic. For dynamic information, the capability profiler also provides statistics for such information, and polynomial regression tools for fitting and prediction. Polynomial regression is well know for fitting and prediction.

Since capability information has distributed sources, capability (and preference) management of client and server side replet arenas exchange their local information to construct the global capability information. Such an exchange is described in detail below. Also, with use of a notification design pattern, the capability management allows other components of the program to subscribe to individual capability items, so that they can be notified when the value of such capability items change.

Capability management is handled by a capability profiler. In one embodiment, the capability profiler measures three types of data: environmental characteristic data, replica characteristic data, and user-perceived response time data.

In one embodiment, the environmental characteristic data includes server-side and client-side CPU utilization and network round-trip time, both of which include a mean and a variance. In the case where multiple access networks available, each access network is represented in the environmental characteristic data. Environmental data may also include persistent and volatile memory available on the client side, and the CPU capability of both sides, in OPS and FLOPS.

In one embodiment, the replica characteristic data includes the persistent and volatile memory requirement of the replica. For volatile memory, this data also includes the maximum and the minimum, in addition to the mean. A replica's CPU characteristics may include measured service time at both client and server sides under different load conditions. The replica's data access characteristic defines the interaction between a replet and its underlying (persistent) data objects.

In one embodiment, the user perceived response time is the time from when the request is sent to the server until the time that the response is received. There are two versions of this data, one in the case when the client replica is used and the other when the server replica is used.

In one embodiment, the CPU utilization information is provided by a CPU load sensor based on the time interval between two consecutive thread yields. The rationale behind this is that Java threads are non-preemptive for threads with the same priority. When a thread yields the control of the processor, it is placed into the end of the queue for threads that are ready for execution. If there is a thread that does nothing but repeatedly yield its control, then the load of the processor can be quantified by measuring the time it takes this thread to complete, for example, 100 yield operations. Intuitively, this load is small when this thread is the only active thread. However, the load number is large when there are many competing threads with the same priority. Therefore, this approach can be used to effectively measure the average wait time of threads with the same priority as the sensor thread.

In one embodiment, the wait time and service time predication information may be generated using polynomial regression, based on current CPU utilization information, and pairs of historic utilization number and time measurement.

An Exemplary Replication Process

Dynamic migration of a replet is the process of determining when and where to install or uninstall, activate or deactivate the replica(s) of the replet, and determining which replica to invoke for a given request. Replet adaptive replication may be useful for mobile users with weak network connections. Such users can experience slow responses and wide variation in such response time. By migrating the replet locally to the client, this response time and variance in response time can be greatly reduced, hence improving the users' experience of the service. For a client with an intermittent connection, a replet replica can be installed on the client.

When the client is disconnected, the local client replica is activated and used. When the client is reconnected to the network, the local replica is deactivated and the owner replica is used. During the process, the client is presented with the illusion that the network has never been disconnected.

Similarly, replet adaptive replication is also applicable to avoiding service degrading caused by overloaded servers. Service quality can be improved if the client replica is selected to be invoked when the server is overloaded, and switched back to using the server replica when the load on the server is significantly improved.

To dynamically select the replica, the replet system has a capability profiler that measures environment parameters, such as, for example, CPU and network performance, and the replica's memory, CPU and interaction characteristics. The server-side and client-side capability profilers then exchange such profiling information, so that both sides have global up-to-date information. The replet system also has a preference manager that defines a collection of default policies and accepts policies for the clients and the applications. Policies defined by the different parties are combined to form a derived runtime policy, and it can be changed on the fly. Finally, the replication manager makes decisions on when to install and activate a replica based on information provided by the capability profiler and policies derived by the preference manager, thereby enabling the replet to adapt to environment and application dynamics.

The replication manager in the replet system manages the replication process of the replets. The replication manager makes runtime decisions based on inputs from the preference manager and the capability profiler to enable an application to adapt to changing environment and application characteristics.

In one embodiment, a replet's replication process includes four phases: (1) the selection of a particular client for replication (the selection phase); (2) the populating of the selected device with code and data (the populating phase); (3) the invocation of a replica (the invocation phase); and (4) the state synchronization among multiple replicas (the synchronization phase). One distinction between various embodiments of the replet and a typical replication system is that the replication process in the replet system relies on capability and preference information of the client, the server and the application, so that the entire process is flexible.

Replication Device Selection

In the selection phase, the replication managers of both client-side and server-side replet arenas collaborate to determine whether the client device should be one of the replication sites of an application deployed on the server.

The client-side replication manager intercepts all the service requests that come from the local client and are targeted to the services residing in remote servers. For services that have not been replicated locally, the replication manager checks a local preference (which, in one embodiment, is derived from a locally defined client partial preference and default server and application partial preferences) and determines if the local client currently allows replet replication. If it does, the replication manager can then attach an optional probe flag to the request that is going to be forwarded to the server. The probe flag indicates that the client allows replet replication.

A server that does not support replet replication ignores the probe flag in the request. However, a server that does support replet replication, upon receiving such flag in the request, determines whether the replet for the requested service allows itself to be replicated. If it does, then the server attaches server and application partial preferences and capabilities to the usual service response, and sends them back to the client. Also attached to the response is a client ID that can later be used to distinguish different clients, and serve as a proof of permission for replication from the server. In one embodiment, the client ID expires after an amount of time. The time may be determined by a preference.

At the client, when the replication manager receives a response with server and application CPI and client ID, the replication manager checks the replet's resource requirement (such as, for example, memory and CPU usage) against resources available on the device to determine whether the device should be a replication site for the replet. In addition, the server and application partial preferences are used to replace default values to complete the client-side derivation of the preference.

Populating a Replication Device

The populating phase starts when the client sends the server a service request with an attached download flag. Note that this populating phase can start at any time between the end of the selection phase and the expiration time of the client ID. A client can use this flexibility to start the populating phase after enough resources have been allocated for replication or when it expects the server to be less loaded (to be able to perform the replication).

The server can choose to send requested code and data back to the client immediately (along with usual service response), or temporarily decline the client's populating request, in which case the client can make another populating attempt later. The code and data to be sent can be specified by the replet itself, and the client ID can be used to further customize the data sent to the specific client.

In one embodiment, when the client supplied a push endpoint in the replication site selection protocol, the server has the option of asynchronously pushing requested code and data to the client at a time deemed proper by the server, rather than having to attach the requested code and data with the service response. This push endpoint is also used for push-based data synchronization. This is discussed further below.

Service Invocation

At the end of the populating phase, the client replica of the replet is created and its state is set as client-synchronized, i.e., the replica's client-specific mutable data is up-to-date. In one embodiment, a client replica in the client-synchronized state is able to serve service requests that only access client private data, without having to synchronize public data with the server.

During the invocation phase, the replication manager intercepts the service request from the local client, and then consults a client-side invocation helper (CIH) (from a preference obtained from the preference manager) for suggestions on where to serve the request. In one embodiment, a suggestion returned by an invocation helper (IH) contains two fields: one indicating whether to use the client replica or the server replica for the request, and the other indicating the confidence of such a suggestion. The suggestion is followed if the confidence level is higher than a threshold defined by the preference. If the suggestion is to use the client replica, then the request is served locally; otherwise, the replication manager forwards the request to the server, and relays the response from the server back to the client, where both the forwarded request and response may contain synchronization information for the client private data.

In cases where the client can't make decisions by itself (that is, when the confidence of CIH's suggestion is below a threshold defined by the preference), the replication manager also forwards the request to the server, attaching an adaptive invocation flag to the request, indicating that it is up to the server to decide where to serve the request. Upon receiving such a service request, the server-side replication manager consults the server-side invocation helper (SIH) for a suggestion. If the suggestion from the SIH is to serve the request on the server, then the server replica is used. Otherwise, the request is bounced back to the client for handling.

One issue in service invocation is selecting the correct replica to invoke. In one embodiment, the suggestions are made according to a particular cost model. However, cost models often vary with different applications, devices and servers. There is no optimal cost model that can be predetermined.

The replet provides a flexible cost model framework through its preference management. All three entities, namely the device, the server, and the application, can specify an IH class that implements a particular cost model (see FIG. 6) in their partial preferences. The preference management decides which helper class to use by merging them in the global preference. An IH has access to the preference and profiled capabilities, as well as the replica itself, in implementing the chosen cost model. The following sample cost models may be used. First, a cost model based on user perceived response time may be used where an IH uses profiled capabilities, including previously measured request processing time, previously measured request and response message sizes, and network characteristics, to compare the estimated costs of using the client replica or the server replica. In such a case, a device moving between good and bad connection areas can use this model to improve the user experience. Second, a cost model based on server load may be used where the SIH bounces adaptive invocation requests back to client (along with updated server load estimator) when the server load is higher than a threshold. In such a case, the corresponding CIH uses a server load estimator to predict the current server load, and uses the client replica when the predicted server load is higher than a threshold. Third, a cost model based on total amount of communication between the server and the client may be used, where an IH uses profiled data including request and response message sizes, CPI exchange overhead, and data synchronization cost to choose a replica for the request to reduce the communication cost.

The invocation of a replet replica may result in modifications to the mutable states of the replet. When such modifications occur and when multiple active replicas exist simultaneously, consistency control mechanisms are used to ensure that the global state of the replet has a consistency level that satisfies the requirement of the application.

Data Synchronization

One aspect of replication is data synchronization among multiple replicas. Aside from the default synchronization scheme provided by the system, which locks the server replica and sends the entire MAR file to the client when a client requests replication and sends the (modified) MAR file back when the client ends replication, in one embodiment, an application is allowed to define its own synchronization scheme. Replet replication gives an application control over what to synchronize, when to synchronize, with whom to synchronize, and how to handle potential update conflicts.

In one embodiment, the replet interface allows each replet to specify what is the immutable state of the replet, which is typically the classes and read-only data used by the replet, and application mutable state, which is the state that can be modified by some replicas and read by other replicas. In addition, each replica can specify session-private state that can only be read/written by a specific session. By separating session-private mutable state from application-wide mutable state, replet replication potentially allows multiple replicas simultaneously modifying states without needing to synchronize state among them, as long as each of them is only modifying its own session mutable state.

A replet can also control when and with whom to synchronize states. In one embodiment, since session-private state is only shared between a client replica and the corresponding server replica, and that the server replica's session state will be invalidated when the session state on the client replica is synchronized, synchronization for session state only happens when the client replica makes an explicit request to have a local replica invalidated and to have synchronization information be sent to the server. In one embodiment, a replet has choices in determining when and with whom to synchronize application global state. These include the following:

A replet can choose optimistic replication or pessimistic replication when a client replica needs to read global application state;

A replet can choose eager update or lazy update when a client replica writes to global application state;

The server replica of the replet can select push or pull model for the propagation of updates to client replicas;

When the push model is used for the update propagation from the server replica, client replicas can choose to do push-based synchronization or not. The server replica only pushes updates to client replicas that are willing to participate in push-based synchronization. Replet adaptive replication handles obtaining synchronization data and handing it to the right party. The interpretation of the synchronization data and the resolution of potential conflicts are handled by applications themselves.

In one embodiment, a service invocation either does not access the mutable data of a replica, or that it only accesses the portion of mutable data that is private to the client, for which synchronizing and maintaining the consistency is easier as there is no concurrent accesses on the same data on multiple replicas.

Figure 11:
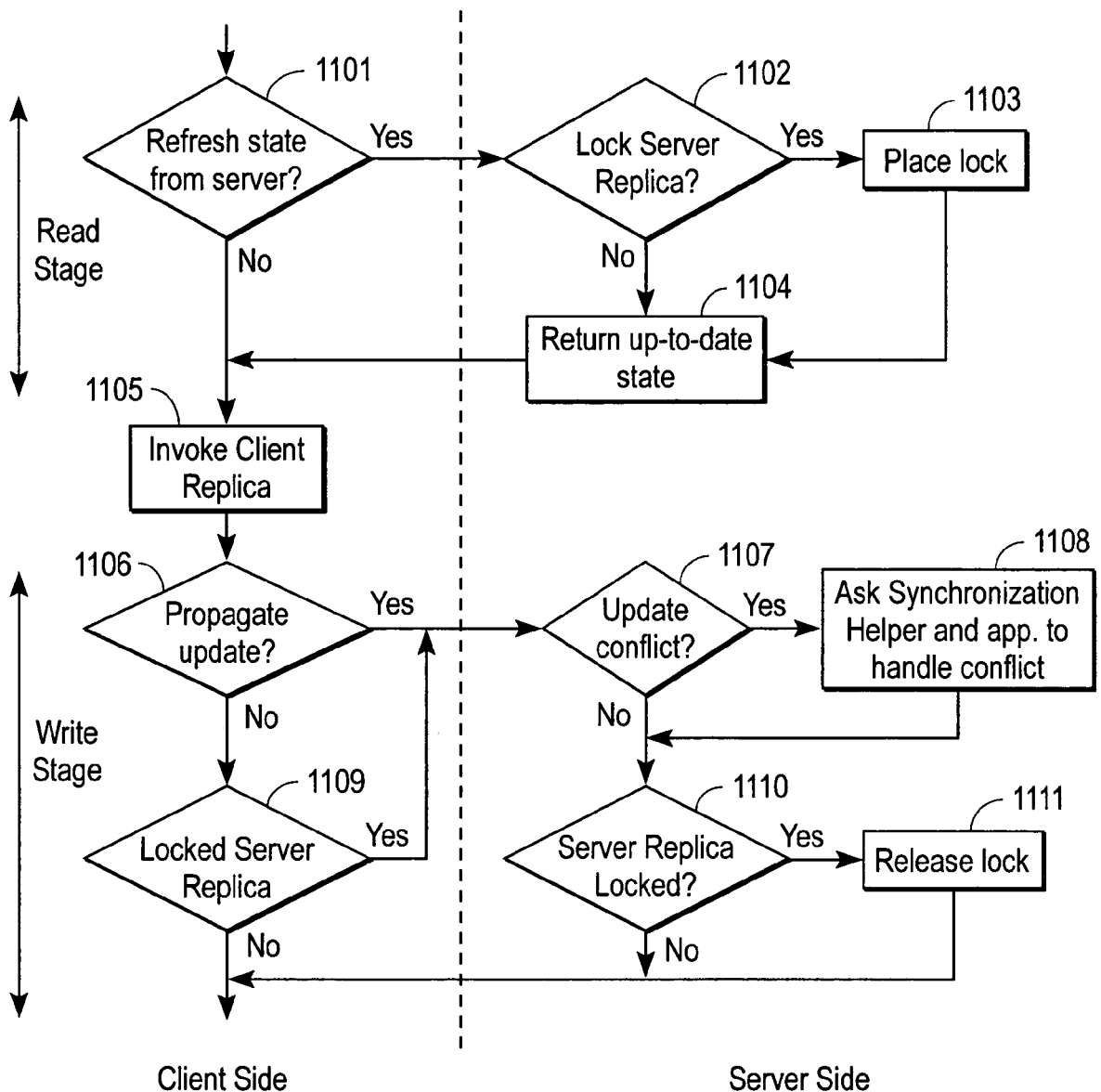
FIG. 11 illustrates one embodiment of a synchronization phase in replet replication that is separated into two stages by an invocation phase: a read stage before the invocation phase, and a write stage after the invocation phase.

Data synchronization and consistency management may be performed differently when an invocation on a client replica reads and/or writes public data of a replet. In one embodiment, the synchronization phase in replet replication is separated into two stages by the invocation phase: a read stage before the invocation phase, and a write stage after the invocation phase. This is shown in FIG. 11. The processing of FIG. 11 is performed by processing logic that may comprise hardware (e.g., circuitry, dedicated logic, etc.), software (such as is run on a general purpose computer system or a dedicated machine), or a combination of both.

During the read stage, on the client side, when the replication manager decides to serve a request locally, it consults the client copy of the synchronization helper (SH) specified by the preference to determine whether a read of the most up-to-date version of the replet's public data from the server replica is needed (processing block 1101). On the server side, when such a read request is received, the replication manager consults the server copy of the SH for the client to determine if it is necessary to apply a write-lock to the server replica to prevent concurrent accesses (processing block 1102). If so, the replication manager places the lock (processing block 1103). The lock expires after a predetermined period of time. In one embodiment, the predetermined period of time is defined by the preference. Note that since there is one preference for each client, potentially each client can have a different SH. Thereafter, the replication manager returns the up-to-date state (processing block 1104).

During the write stage, on the client side, after an invocation on the client replica that modifies the replet's public data (processing block 1105), the replication manager again consults the SH to see if there is a need to propagate the modification to the server replica immediately (processing block 1106). If not, the replication manager determines if the server replica is locked (processing block 1109) and if so, transitions to processing block 1107. If so, on the server side, when such a modification propagation message is received, the replication manager consults the SH of the client to potentially detect update conflicts (processing block 1107) and resolves such conflicts (processing block 1108). Resolving the conflicts may involve asking the SH and application to handle the conflict. The replication manager then determines if the server replica is locked (processing block 1110) and releases the lock on the server replica if the client acquired one during the read stage (processing block 1111). Finally, the replication manager consults the SHs of other clients to see if the modification needs to be pushed to these clients.

Note that the actuation of the read and write stages depends on whether the invoked method reads or writes public data. If the method does not read or write public data, then the read stage or write stage, respectively, is bypassed.

The SH is also part of the preference and can potentially be defined by the client, the server, or the application. Some sample consistency maintenance schemes that can be implemented using a SH include pessimistic replication, optimistic replication with 1/K synchronization, optimistic replication with a push approach. Pessimistic replication is where one-copy serializability is achieved by demanding to refresh from server replica before each invocation that reads replet public data, lock the server replica after refresh, and contact server replica after invocation for update propagation and lock release. Optimistic replication with 1/K synchronization is where the data refreshment and update propagation is carried out once for every K invocations that access public data, and no lock is applied on the server replica. Optimistic replication with push approach is where the client depends on updates pushed from the server to maintain the freshness of the replet's public data.

The pessimistic replication scheme can be practical if a small fraction of the invocations involve accesses to public data, and/or if data synchronization overhead is less costly than the overhead associated with the transport of request and response messages and the processing of the request on the server. Other sample consistency schemes include one that chooses the correct update rate depending on client capability and current server load for self-refreshing Web contents, and another enforced by a server under unusually high load to temporally disable a device from reloading the content until sometime later.

ALTERNATIVE EMBODIMENTS

In one embodiment, the replet system is implemented in Java for Web-based applications that use servlets as service objects. A Tomcat servlet container from the Apache Jakarta Project may be used as a service engine.

Replet arenas may be implemented as standalone processes. For a given application, the server-side replet arena (the arena that hosts the application) functions as a Web server with servlet (and replet) support, while the client-side replet arena is configured as a HTTP proxy of the client Web browser. The server-side and the client-side replet arenas may communicate using the HTTP protocol. In such a case, fields of replet replication protocol messages (such as, for example, various flags, CPI, IH suggestions, and synchronization data) are piggybacked with HTTP requests and responses in the form of HTTP header fields.

In one embodiment, a replet extends the J2EE HTTPServlet class, and implements the replet interface. In one embodiment, the replet interface specifies methods that can be used by the replication manager to get and set client-specific immutable and mutable (both public and private) data. The immutable and mutable data can be a combination of in-memory objects, files and (usually filtered) database tables. In one embodiment, the default implementation of these methods assumes that there is no immutable data, and that the public mutable data consists of the entire Web archive (WAR) file of the replicable service application except those under WEB-INF/classes and WEB-INF/lib, while the private mutable data consists of the HTTPSession object created for the client. The replet interface may also retrieve and apply updates for synchronization. The updates can also be represented using in-memory objects, files and tables. In one embodiment, the default implementation assumes that the entire Web archive has been updated.

Nonintrusive Replication

In one embodiment, the replication process is nonintrusive to both the clients and the server. One probable source of intrusiveness is in the populating phase, where the replet system needs to collect relevant code and data at the server side, send them to the client, and properly install such code and data at the client side. To an already overloaded server, this process may exacerbate the load situation especially when populating is required for many clients in a short period of time. To the client, this process may stall the responsiveness of other requests as receiving the replica and installing it may be costly for some devices. One solution is to give the server the option of populating a client only when the server thinks it is the correct time to do so, and allow the server to asynchronously push the replica to the client, so that populating can occur between two requests and be less intrusive.

Server Load Information

A representation of dynamic server load information that can be used to closely predict future server load is important in the replet system, as it can help improve the performance of the system with low cost. The polynomial regression approach may be used. The dissemination of server load information may be performed by piggybacking the information with some of the responses to the client.

Session Migration

Session migration is necessary to support replication in the middle of a client session, and it is the default form of populating client device with client-specific mutable data in one embodiment. Cookie-based HTTP sessions may be used. During the migration, the client-side replet arena creates a local session cookie and a new session object. The new session object is populated with contents from the original session on the server session, and the newly created cookie is returned to the client.

Public Data Access Directives

In one embodiment, XML-form external directives may be used to denote where the GET and POST handling methods of a replet reads or writes public data. However, a replet may be used for different types of requests. Some of these requests may access public data while others may not. To distinguish such a request, an approach similar to J2EE Servlet mapping is used. Each request type is allocated a virtual replet. While these virtual replet map to the same real replet, public data access directives are generated for each individual virtual replet. For example, in a WebCalendar application, creating an appointment accesses public data while viewing an appointment does not. Although the same replet may handle these two operations, in one embodiment, their URI maps to different virtual replets with different access directives, so that the viewing operation can always be operated locally for a client replica.

An Exemplary Replication Manager

The replication manager controls the adaptation of replets by overseeing the install/uninstall, activation/deactivation, and the invocation of all replet replicas in a replete arena. In one embodiment, the replication manager is invoked whenever any of the following happens: a time-out occurs; a message sent by another replication manager is received; a service request is received; a service result is received; profiling data is collected; a policy guideline item is updated; and state synchronization occurs.

Figure 12:
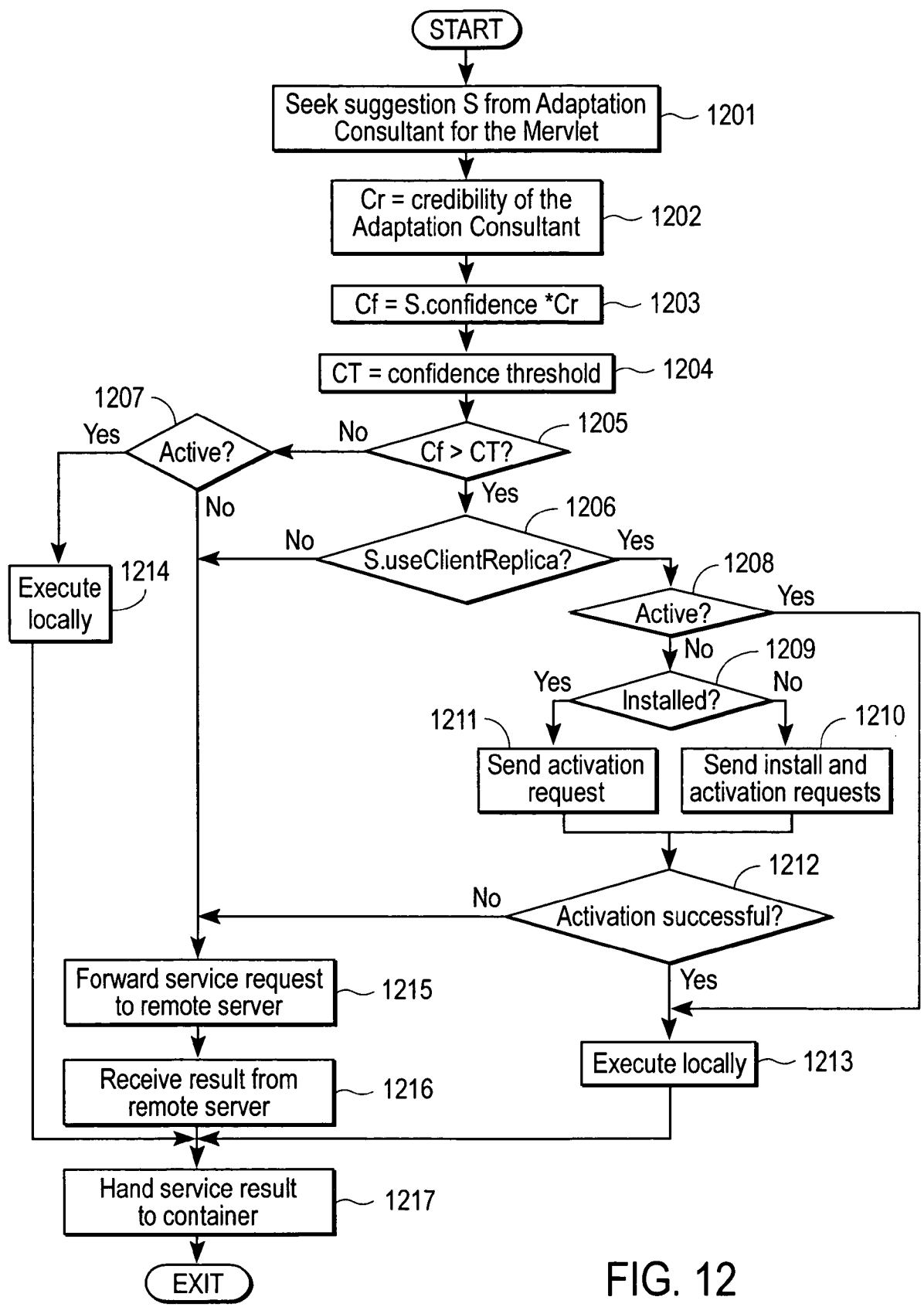
FIG. 12 is a flowchart of one embodiment of a process to handle when a service request is received.

FIG. 12 is a flow diagram of one embodiment of a process to handle when a service request is received. When invoked, the replication manager locates the correct helper, obtains a suggestion from it, and stores the suggestion for future reference. Suggestions from helpers, however, are only used as references rather than demand. A suggestion is only a recommendation with associated confidence level for one application. The replication manager can potentially manage multiple applications. In one embodiment, the final decision for an application depends on global and historical information such as, for example, current suggestion for the application; historical suggestions and decisions for the application; application characteristics as formerly described; current and historical suggestions and decisions for other applications; and characteristics of other applications.

The purposes of incorporating historical and global data may be to avoid thrashing for the same application (jumping between client and server replica back and forth), to avoid thrashing among multiple applications (when cache space is not enough to hold all application client replicas), and to perform system-wise rather than application-wise optimization.

Referring to back to FIG. 12, the process is performed by processing logic which may comprise hardware (e.g., circuitry, dedicated logic, etc.), software (such as is run on a general purpose computer system or a dedicated machine), or a combination of both. The process begins by processing logic seeking a suggestion from a correct helper (e.g., an adaptation consultant for the mervlet) (processing block 1201). Processing logic sets the credibility of the helper equal to Cr (processing block 1202), the confidence of the suggestion multiplied by the credibility of the helper equal to Cf (processing block 1203), and the confidence threshold equal to CT (processing block 1204).

Processing logic then tests whether the confidence is greater than the confidence threshold (processing block 1205). If it is, processing transitions to processing block 1206 where processing logic determines whether the suggestion is to use the client replica. If it is not, processing logic transitions to processing block 1215. If it is, processing logic tests whether the client replica is active (processing block 1208). If it is active, processing transitions to processing block 1213 where the client replica executes locally. If it is not active, processing logic determines whether it is installed (processing block 1209). If it is installed, processing logic sends an activation request (processing block 1211) and thereafter transitions to processing block 1212. If it is not installed, processing logic sends install and activation requests (processing block 1210) and processing transitions to processing block 1212. At processing block 1212, processing logic tests whether the activation was successful. If it was successful, processing transitions to processing block 1213 where the client replica executes locally. After the client replica executes locally, processing logic transitions to processing block 1217. If activation was not successful processing transitions to processing block 1215.

If the confidence value was not greater than the confidence threshold, processing logic transitions to processing block 1207 where processing logic tests whether the server replica is active. If it is, processing logic executes the server replica (processing block 1214), and transitions to processing block 1217. If the server replica is not active, processing transitions to processing block 1215.

At processing block 1215, processing logic forwards the service request to a remote server. Then processing logic receives the result from the remote server (processing block 1216) and then hands the service results to a container (processing block 1217). Thereafter the process ends.

An Exemplary Inter-Replication Manager Protocol

Figure 13:
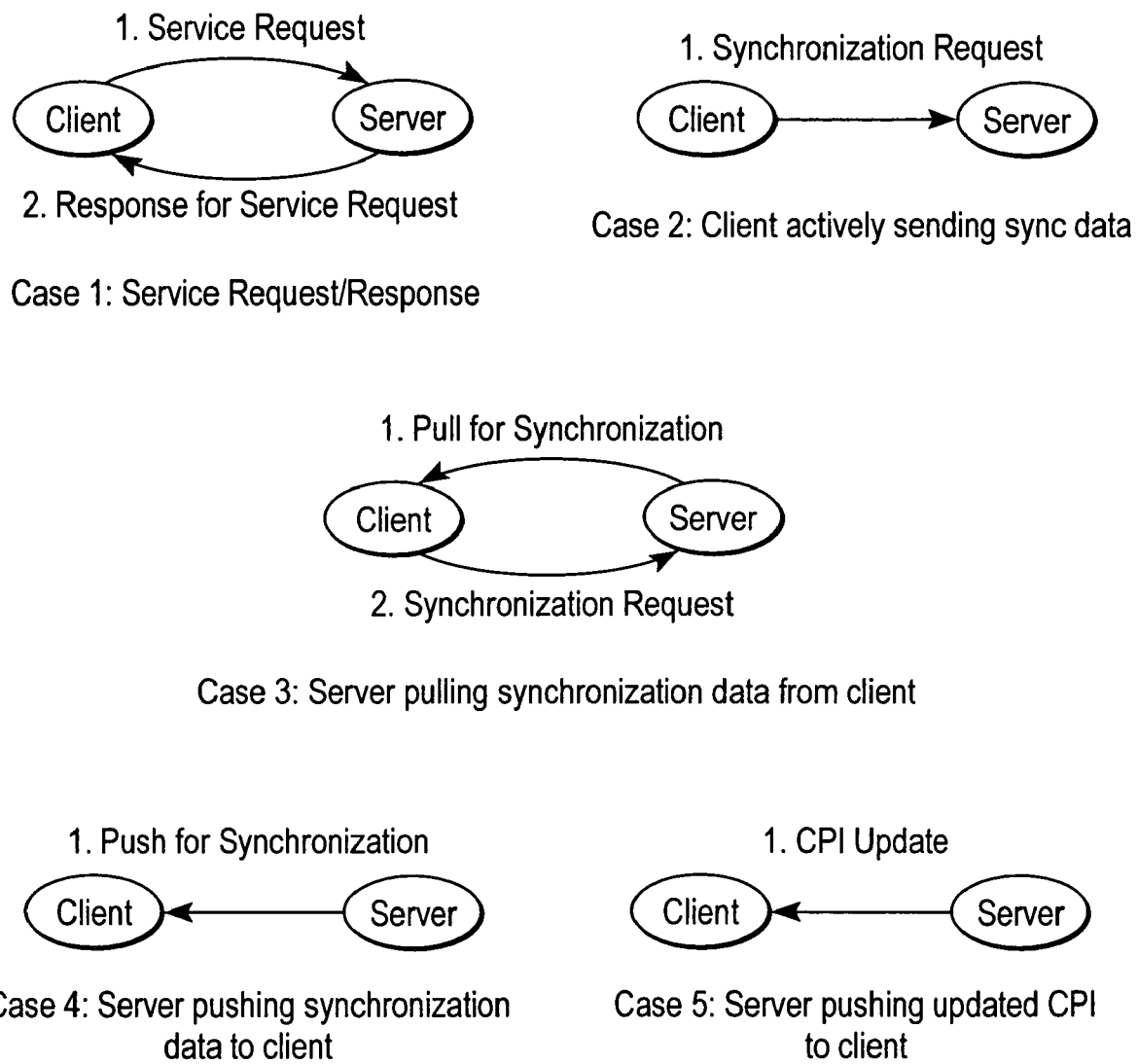
FIG. 13 lists five cases of communication between a client replication manager and a server replication manager using inter-replication manager protocol messages.

One embodiment of the inter-replication manager protocol defines a communication protocol between client-side replication manager and server side replication manager. This protocol uses HTTP as lower level transport. Inter-replication manager protocol messages are sent as HTTP header fields. FIG. 13 lists 5 cases of communication between a client replication manager and a server replication manager using inter-replication manager protocol messages. These cases are described below.

Service Request from the Client to the Server

In one embodiment, when the client receives a request from the browser, it has two choices: either immediately serve the request locally or send a service request message to the server. The client can immediately serve the request locally only when it has an active replica of the replet and that it decides to use this local active replica. In all other cases (even when the client decides to execute locally), the client sends a service request to the server. In one embodiment, the service request message has following fields:
1. The original request from the browser (required)
2. Session ID of the if device supports multiple sessions (optional)
3. The client-side decision and client-side helper credibility (optional)
4. Client capability and user preference (optional)
5. The state of client-side replica (optional)
6. Client knowledge of server capability, server preferences, and application preferences (optional)
7. Application synchronization data (optional)
8. Session synchronization data (optional)
9. Whether the client allows server push (optional, default is false)

When the server receives the service request message, it immediately serves the request if the message only contains the original request (field 1).

Synchronization Request from the Client to the Server

A client with locally active replica may proactively (i.e., with receiving a request from browser) synchronize its state with the server. In one embodiment, this can happen when:
1. The client finished serving a request locally;
2. The client replica is about to be destroyed (from instantiated to non-instantiated);
3. The application itself asks to synchronize state; and 4. The server uses "Pull for Synchronization" to get synchronized state Response for a Service Request This is the message sent from the server to the client in response of the service request message. The message can be the result of executing server replica of the replet, or it contains necessary information so that the client itself can use this information to activate its local replica and service the request locally.

In one embodiment, the message has following fields:
1. An field indicating whether this is a real service response (required)
2. Real service response (optional)
3. Server capability (optional)
4. Application and server preference (optional)
5. Synchronization data (optional)

Note that fields 3, 4, and 5 can be present even when field 2 is present.

Pull for Synchronization Sent from the Server to the Client

The server asks the client for up-to-date state information. In one embodiment, fields in this message are:
1. A flag indicating whether the server also wants session-specific synchronization data, in addition to application-wide synchronization data. (required)
2. Server dynamic capability (optional)
3. Server and application preference updates (optional)

Push for Synchronization Sent from the Server to the Client

The server pushes synchronization data to the client. In one embodiment, the fields in this message are:
1. Application-wide synchronization data
2. Server dynamic capability (optional)
3. Server and application preference updates (optional)

Capability/Preference Information (CPI) Update

The server pushes new CPI information to the clients that subscribed to them (those have active replica and allow server push). In one embodiment, the fields are:
1. Server dynamic capability (optional)
2. Server and application preference updates (optional)

An Exemplary Adaptation consultant Interface

```
public interface AdaptationHelper {
    public AdaptationSuggestion clientConsult (RepletWrapper mervlet,
        HttpSession sID);
    AdaptationSuggestion serverConsult (RepletWrapper mervlet,
        ClientExtendedCPI cecpi, HttpSession sessionID);
}
public class RepletWrapper {
    public Preference getPreference ( );
    public Profiler getProfiler ( );
}
public class AdaptationSuggestion {
    boolean useClientReplica;
    float confidence;
}
```

System Description

Figure 14:
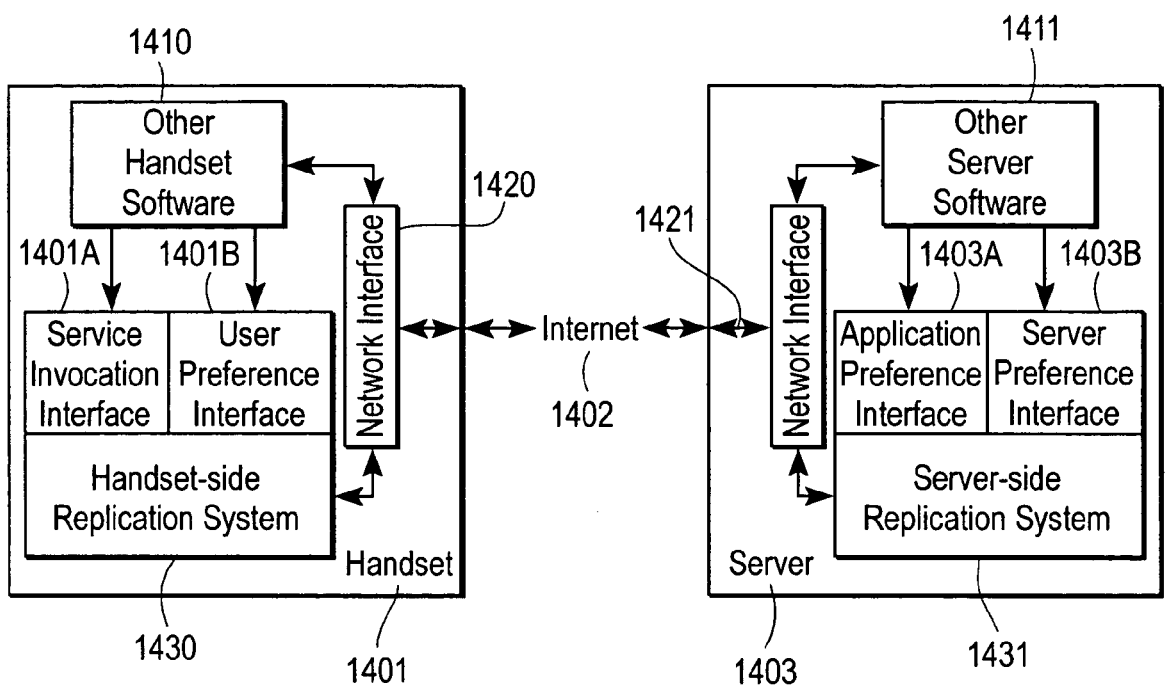
FIG. 14 is one embodiment of a handset-Internet-server environment.

FIG. 14 is one embodiment of a handset-Internet-server environment. Referring to FIG. 14, an environment is shown in which a handset 1401 connects to a server 1403 via Internet 1402 using network interface 1420. Other software 1410, such as, for example, a Web browser, of the handset interacts with the handset-side replication system 1430 using the service invocation interface 1401A and user preference interface 1401B. Likewise, at the server side, other software 1411, such as, for example, a server configuration program, interacts with server-side replication system 1431 via application preference interface 1403A and server preference interface 1403B. Server 1403 also includes a network interface 1421 that interacts with server-side replication system 1431 and other server software 1421. Although not shown, handset 1401 and server 1403 include the necessary hardware and software, such as shown, for example, in FIG. 21 to perform the software and the replication system.

Figure 15:
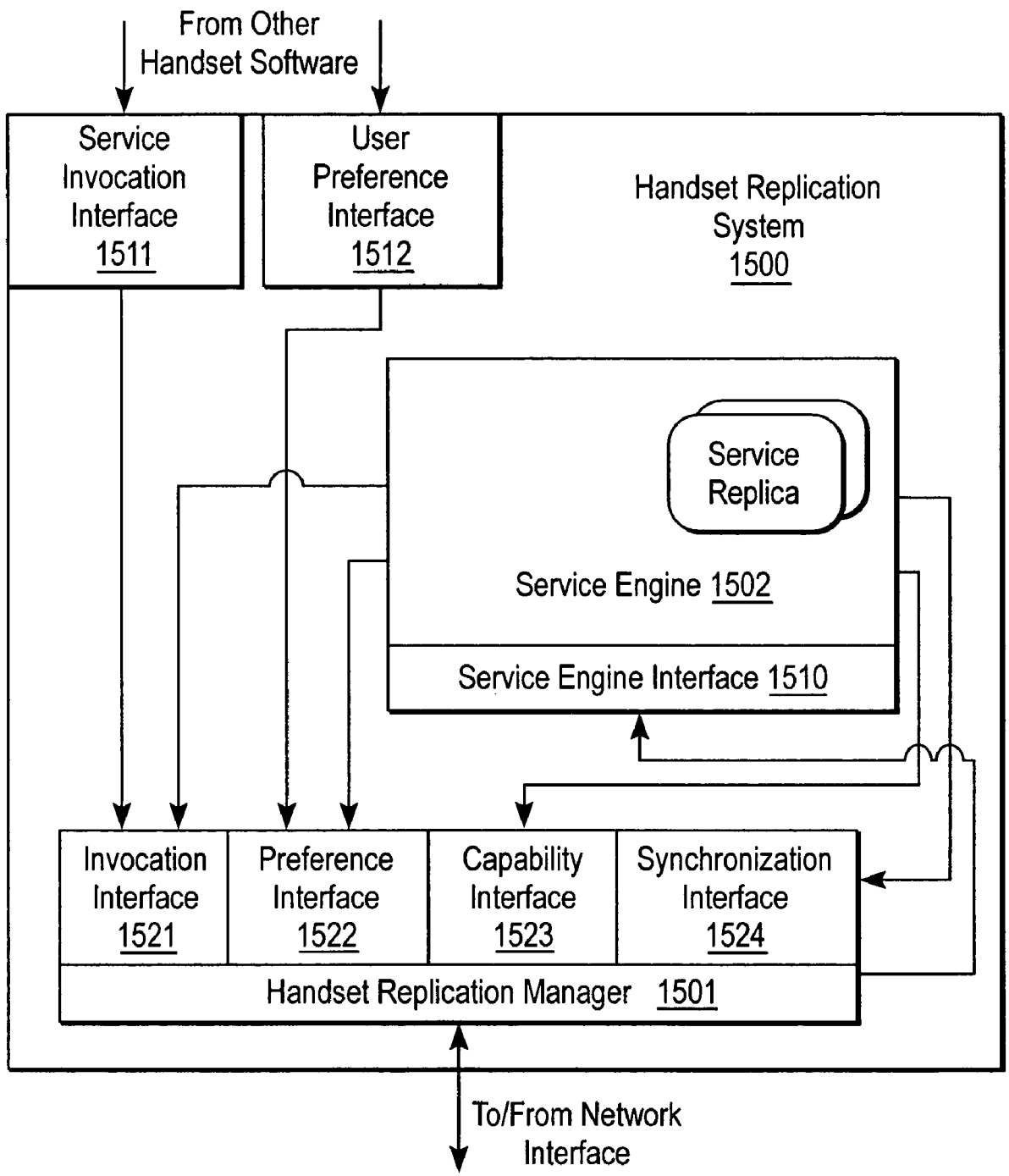
FIG. 15 is a block diagram of one embodiment of a handset.

FIG. 15 is a block diagram of one embodiment of a handset replication system. Referring to FIG. 15, the handset includes a handset-side a replication manager 1501 and a service engine 1502 as part of a handset replication system. Handset replication manager 1501 includes an invocation interface 1521, a preference interface 1522, a capability interface 1523, and a synchronization interface 1524. Invocation interface 1521 receives inputs from service invocation interface 1511 and service engine 1502. Service invocation interface 1511 interfaces with other handset software. Similarly, preference interface 1522 receives inputs from user preference interface 1512 and service engine 1502. User preference interface 1512 receives inputs from other handsets software. Capability interface 1523 receives inputs from service engine 1502 as does synchronization interface 1524. A handset replication engine 1501 interfaces with service engine 1502 through service engine interface 1510, while also communicating with the network interface.

Figure 16:
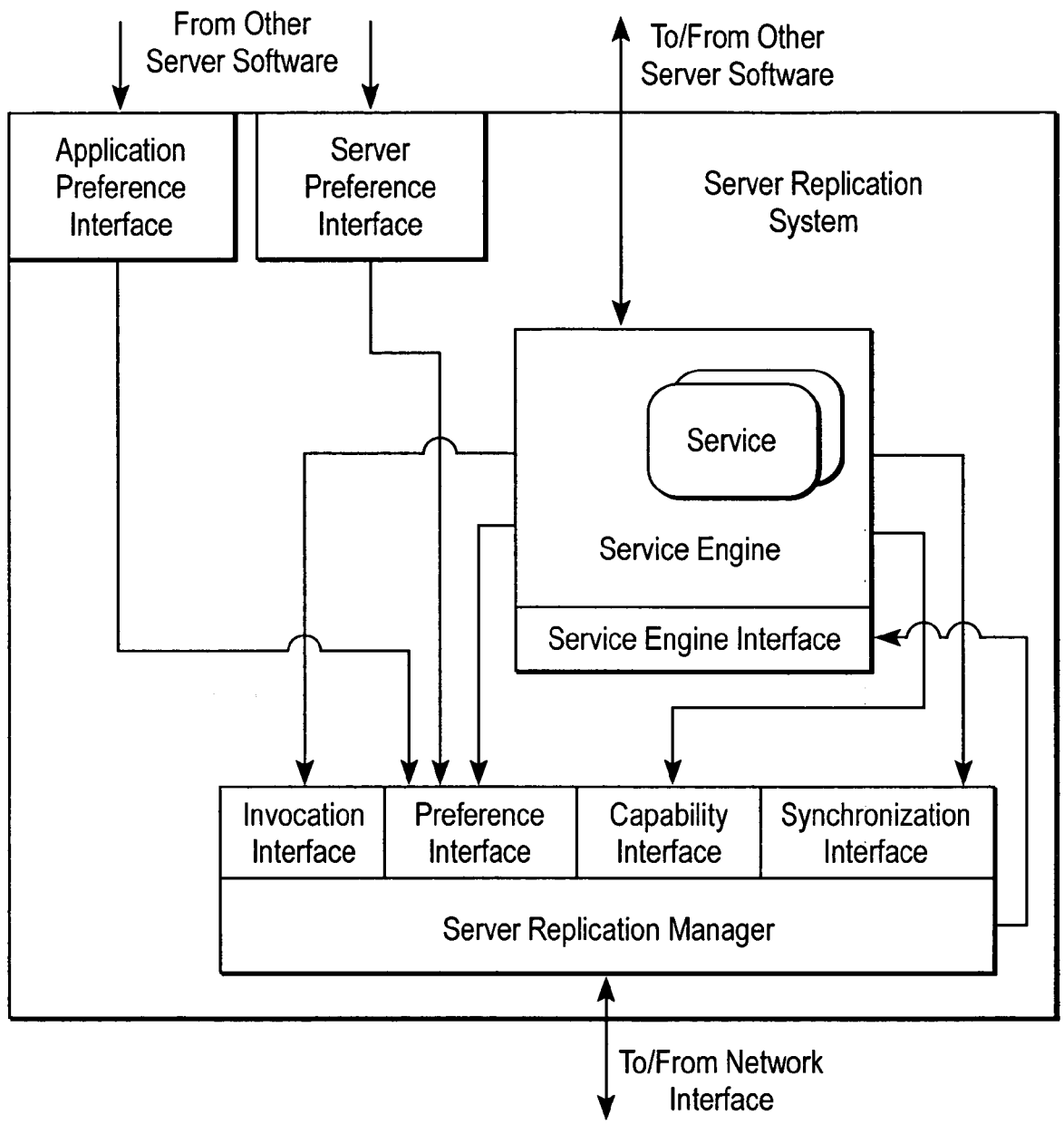
FIG. 16 is a diagram of one embodiment of a server.

FIG. 16 is the corresponding diagram of one embodiment of a server. The two parts share the same set of interfaces.

Figure 21:
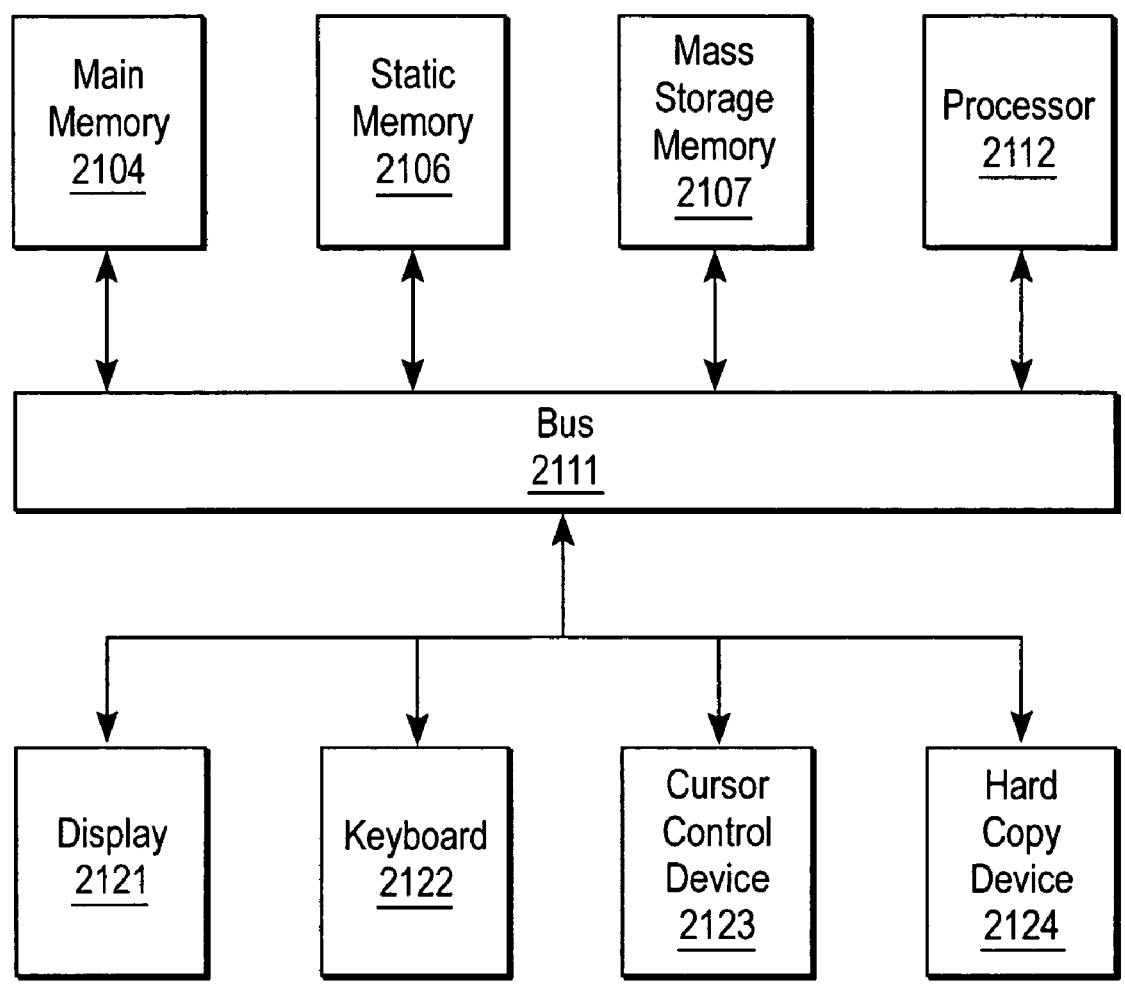
FIG. 21 is a block diagram of an exemplary computer system.

FIG. 21 is a block diagram of an exemplary computer system that may perform one or more of the operations described herein, including those of the handset or the server. Referring to FIG. 21, computer system 2100 may comprise an exemplary client 2150 or server 2100 computer system. Computer system 2100 comprises a communication mechanism or bus 2111 for communicating information, and a processor 2112 coupled with bus 2111 for processing information. Processor 2112 includes a microprocessor, but is not limited to a microprocessor, such as, for example, Pentium™, PowerPC™, Alpha™, etc.

System 2100 further comprises a random access memory (RAM), or other dynamic storage device 2104 (referred to as main memory) coupled to bus 2111 for storing information and instructions to be executed by processor 2112. Main memory 2104 also may be used for storing temporary variables or other intermediate information during execution of instructions by processor 2112.

Computer system 2100 also comprises a read only memory (ROM) and/or other static storage device 2106 coupled to bus 111 for storing static information and instructions for processor 2112, and a data storage device 2107, such as a magnetic disk or optical disk and its corresponding disk drive. Data storage device 2107 is coupled to bus 2111 for storing information and instructions.

Computer system 2100 may further be coupled to a display device 2121, such as a cathode ray tube (CRT) or liquid crystal display (LCD), coupled to bus 2111 for displaying information to a computer user. An alphanumeric input device 2122, including alphanumeric and other keys, may also be coupled to bus 2111 for communicating information and command selections to processor 2112. An additional user input device is cursor control 2123, such as a mouse, trackball, trackpad, stylus, or cursor direction keys, coupled to bus 2111 for communicating direction information and command selections to processor 2112, and for controlling cursor movement on display 2121.

Another device that may be coupled to bus 2111 is hard copy device 2124, which may be used for printing instructions, data, or other information on a medium such as paper, film, or similar types of media. Furthermore, a sound recording and playback device, such as a speaker and/or microphone may optionally be coupled to bus 2111 for audio interfacing with computer system 2100. Another device that may be coupled to bus 2111 is a wired/wireless communication capability 2125 to communication to a phone or handheld palm device.

Note that any or all of the components of system 2100 and associated hardware may be used in the present invention. However, it can be appreciated that other configurations of the computer system may include some or all of the devices.

Exemplary Protocols

Figure 17:
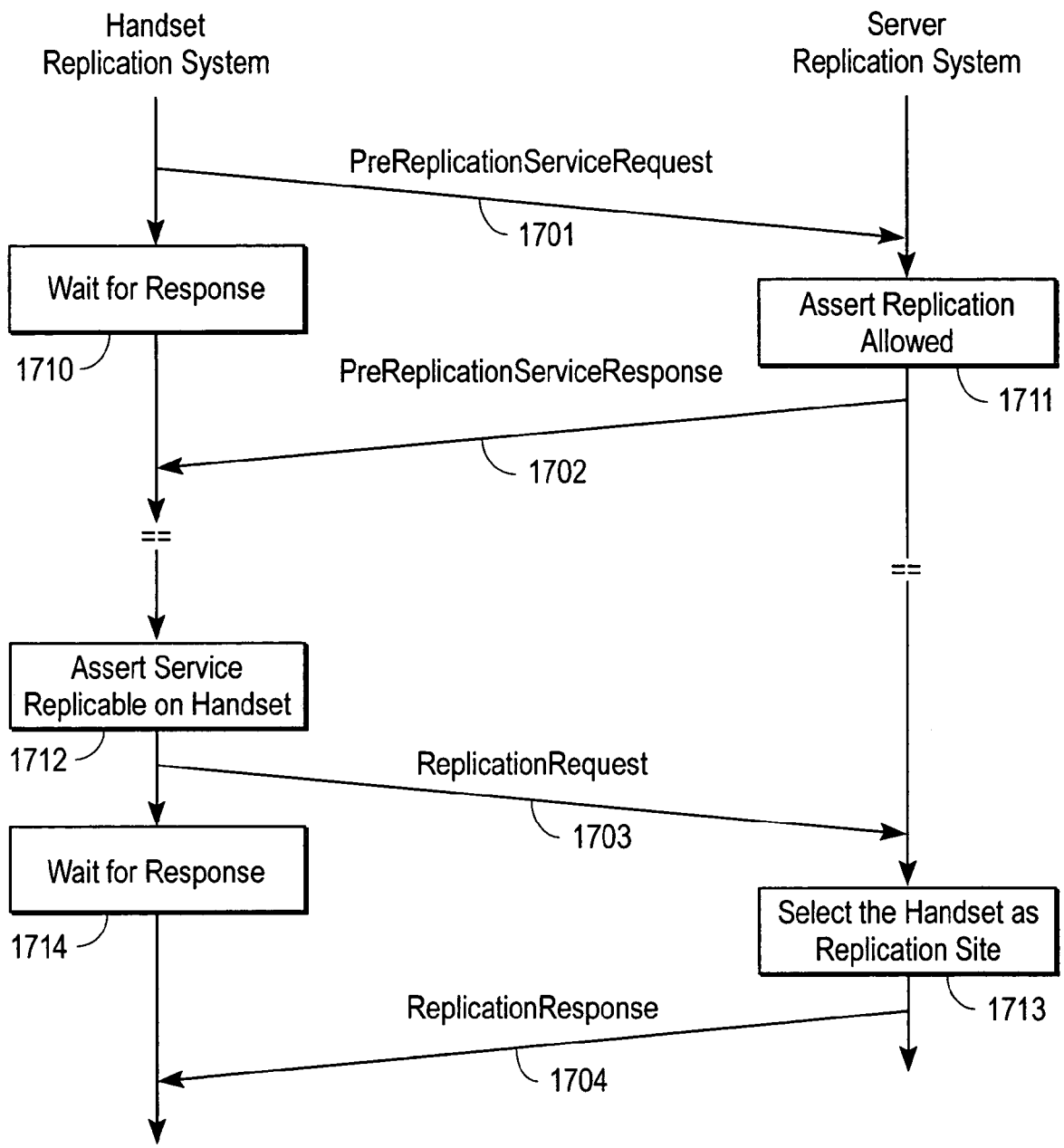
FIG. 17 illustrates one embodiment of a set of sequences of replication site of a replication site selection protocol.

FIG. 17 illustrates one embodiment of a set of sequences of a replication site of a replication site selection protocol. The handset replication system generates a service request 1701 that is sent to the server replication system. After sending service request 1701, the handset replication system waits for a response (1710). The server replication system, in response to service request 1701, generates an indication that replication is allowed (1711), and sends a service response 1702 to the handset replication system. At a time later, the handset replication system asserts a service replicable on the handset (1712), sends a replication request 1703 to the server replication system, and waits for a response (1714). While the handset replication system waits for a response, the server replication system selects the handset at the replication site (1713) and generates a replication response 1704 that is sent to the handset replication system.

Figure 18:
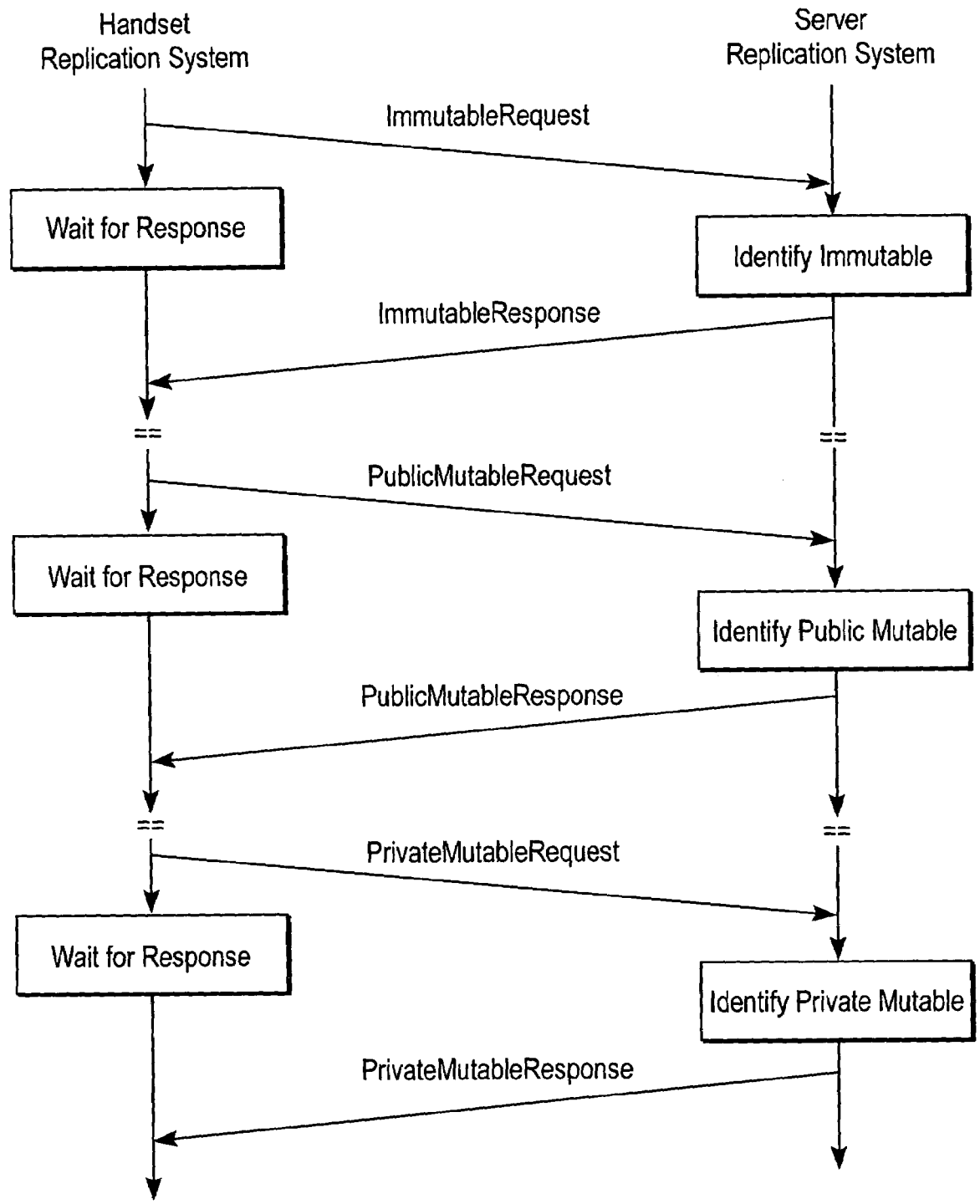
FIG. 18 illustrates one embodiment of a replication population protocol.

FIG. 18 illustrates one embodiment of a replication population protocol. Referring to FIG. 18, three separate requests are made from the handset replication system to the server replication system, one for an immutable data request, a public mutable data request and a private mutable data request. After each of the requests, the handset replication system waits for a response from the server replication system. The server identifies the immutable data, the public mutable data and the private mutable data and sends the corresponding response to the handset replication system.

Figure 19:
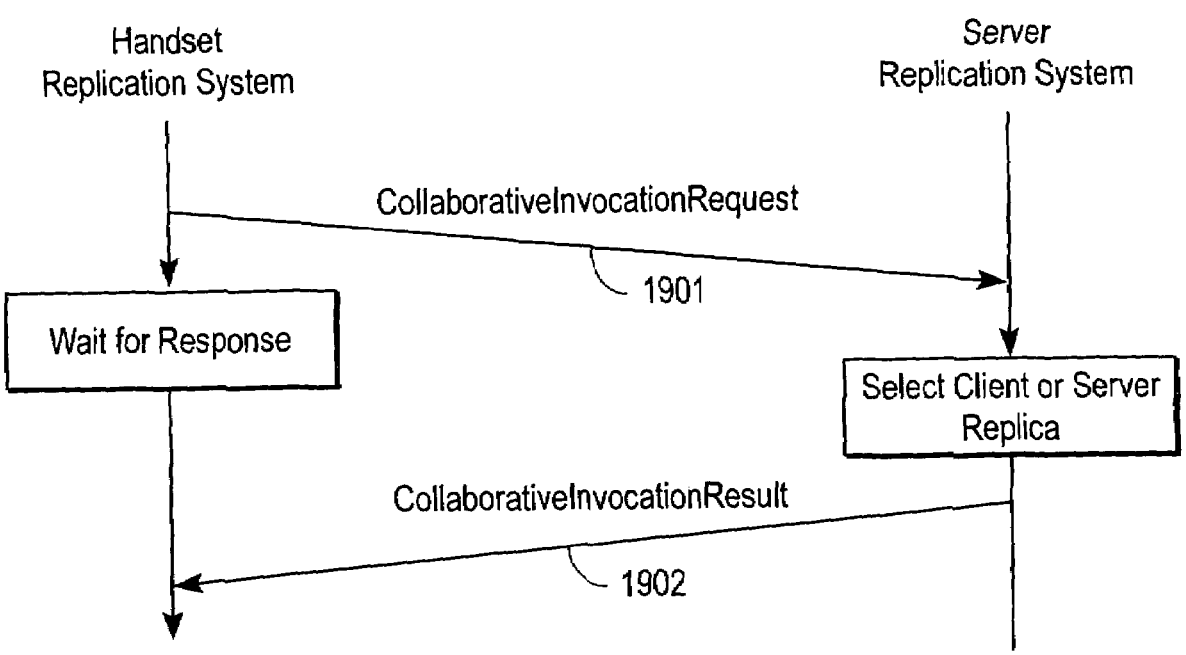
FIG. 19 illustrates one embodiment of a collaborative service invocation protocol.

FIG. 19 illustrates one embodiment of a collaborative service invocation protocol. Referring to FIG. 19, the handset replication system makes a collaborative service invocation request 1901 to the server replication system and waits for a response. Server replication system selects either the client or server replica and sends the collaborative invocation result 1902 to the handset replication system.

Figure 20:
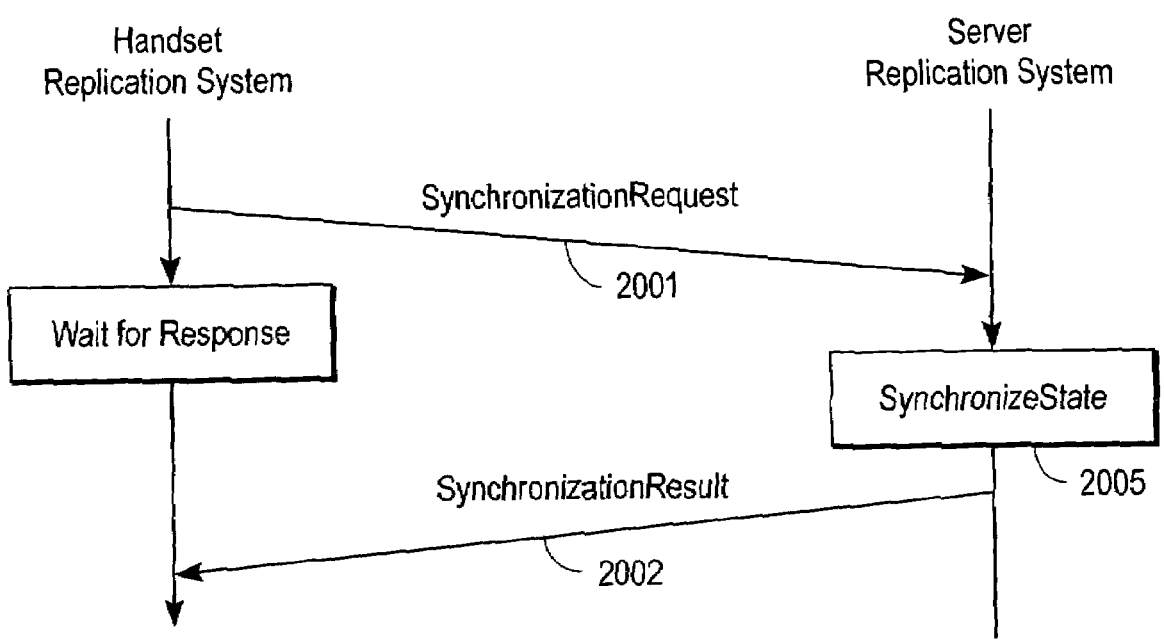
FIG. 20 illustrates one embodiment of a state synchronization protocol.

FIG. 20 illustrates one embodiment of a state synchronization protocol. Referring to FIG. 20, the handset replication system sends synchronization request 2001 to the server replication system and waits for a response. The server replication system synchronizes the state (2005) and sends the results of synchronization result 2002 to the handset replication system.

Each of these protocols may be used in the handset/server system described in FIGS. 13-15.

Definition of Messages and Data Types

```
public class RegularServiceRequest {
    String serviceName;
    Object[ ] arguments;
}
public class PreReplicationServiceRequest {
    Boolean replicationEnabled;
    RegularServiceRequest request;
}
public class ApplicationProfile {
    int memoryUsage, storageUsage;
    float cpuUsageHint;
    DataUpdateHint dataUpdateHint;
}
public class PreReplicationServiceResponse {
    ApplicationProfile appProfile;
    ApplicationPreference appPreference;
    ServerPreference serverPreference;
    Object response;
}
public class DataUpdataHint {
    float publicHint, privateHine;
}
public class Preference {
    PreferenceItem[ ] list;
}
public class PreferenceItem {
    String name;
    String value;
    int priority;
}
public class ReplicationRequest {
    String serviceName1;
    Capability deviceCapability;
    Preference devicePreference;
}
public class Capability {
    StaticCapability[ ] staticCapability;
    DynamicCapability[ ] dynamicCapability;
}
public class StaticCapability {
    String name;
    Object value;
}
public class DynamicCapability {
    String name;
    StatisticInfo statInfo;
    TTL ttl;
}
public class TTL {
    int timeInSec;
    int noOfAccesses;
}
public class ReplicationResponse {
    boolean replicationAllowed;
    Object privateID;
}
public class ImmutableRequest {
    String serviceName;
    Object privateID;
}
public class ImmutableResponse {
    Object publicImmutable, privateImmutable;
}
public class PublicMutableRequest {
    String serviceName;
    Object versionNumber;
}
public class MutableResponse {
    Object response;
    Object versionNumber;
}
public class privateMutableRequest extends publicMutableRequest {
    Object privateID;
}
public class CollaborativeInvocationRequest {
    String serviceName;
```

```
        Object[ ] arguments;
        Object privateID;
        ClientSuggestion clientSuggestion;
    }
    public class ClientSuggestion {
        boolean onServer;
        float confidence, credibility;
    }
    public class CollaborativeInvocationResult {
        boolean servicedOnServer;
        Object regularServiceResult;
        ModifiedState publicModifiedState;
    }
    public class SynchronizationRequest {
        String serviceName;
        Object privateID;
        ModifiedState publicModifiedState, privateModifiedState;
    }
    public class ModifiedState {
        Object data;
        Object versionNumber;
    }
    public class SynchronizationResult {
        Object updateConflict;
        ModifiedState publicModifiedState;
    }
```

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A computer-implemented method comprising:
   gathering run-time capability and preference information for an application, client device and server regarding an application service object having executable code; and
   directing replication of at least one application service object from the server to the client device based on the client, the server, and the application run-time capability and preference information to enable execution of the at least one application service object by the client device, wherein directing replication comprises sending a replica of the at least one application service object to the client device from the server.

2. The method defined in claim 1 wherein the client device capability and preference information comprises one or more of processor speed, central processing unit (CPU) processing power, available memory, available power, availability of a just-in-time compiler, down-link network bandwidth, up-link network bandwidth, and round trip time to the server.

3. The method defined in claim 1 wherein the capability and preference information for the application, the client device and the server comprises one or more of data consistency requirements and latency tolerance levels.

4. The method defined in claim 1 wherein the server capability and preference information comprises one or more of connectivity of the server and server load changes.

5. The method defined in claim 1 wherein the run-time capability and preference information for the application, the client device and the server comprises client-specific, application-specific, and server specific cost metrics.

6. The method defined in claim 1 further comprising:
   for each service request, determining whether to invoke the at least one service object on the server or replicated on the client device using a decision object based on the run-time capability and the preference information.

7. The method defined in claim 1 further comprising:
   querying a synchronization helper acquired from the preference information to determine when to synchronize application data replicated on the client device with a copy of the application data on the server.

8. The method defined in claim 7 further comprising querying a synchronization helper acquired from the preference information to determine whether to lock the copy of the application data on the server after synchronization.

9. The method defined in claim 1 wherein the at least one application service object comprises World Wide Web-related application logic.

10. The method defined in claim 1 further comprising determining whether the at least one application service object is executable on a server based on the capability and preference information.

11. The method defined in claim 10 further comprising:
    collecting preference information for the client and the server;
    resolving differences in one or more preferences of the client and the server to determine whether the at least one application service object is to be run on the client device or the server.

12. An article of manufacture having one or more computer readable storage media storing instructions thereon which, when executed by a system, cause the system to:
    gather run-time capability and preference information for an application, client device and server regarding an application service object having executable code; and
    direct replication of at least one application service object from the server to the client device based on the client, the server, and the application run-time capability and preference information to enable execution of the at least one application service object by the client device, wherein replication comprises sending a replica of the at least one application service object to the client device from the server.

13. A server comprising:
    a network interface for use in communicating to one or more client devices;
    a replication system having
        preference and capability interfaces to gather run-time capability and preference information for an application, client device and server regarding an application service object having executable code; and
        a replication manager to direct replication of at least one application service object from the server to the client device based on the client, the server, and the application run-time capability and preference information.

14. A client device comprising:
    a network interface for use in communicating to a server;
    a client-side replication system having
        preference and capability interfaces to gather run-time capability and preference information for a client device regarding an application service object having executable code;
        and
        a replication manager to request replication of at least one application service object from the server to the client device based on the run-time capability and preference information.

15. A system comprising:
a preference manager;
a capability profiler; and
a replication manager, using the preference management information from the preference manager and the capability management information from the capability profiler, to direct replication of a replicable application service object, which has executable code, that is part of a replicable service deployed on a server to a client, wherein the replicable application service object handles one or more requests from the client and generates one or more results in response to the one or more requests, and further wherein the replicable application service object has a plurality of replicas.

16. The system defined in claim 15 wherein the replication manager performs one or more of a group of operations that includes selecting the client, populating the client with code and data, synchronizing the plurality of replicas and selecting a synchronized replica for serving a request.

17. The system defined in claim 15 wherein the client device capability and preference information comprises one or more of processor speed, central processing unit (CPU) processing power, available memory, available power, availability of a just-in-time compiler, down-link network bandwidth, up-link network bandwidth, and round trip time to the server.

18. The system defined in claim 17 wherein the mutable data comprises a public fragment and a private fragment.

19. The system defined in claim 15 wherein the capability and preference information for the application, the client device and the server comprises one or more of data consistency requirements and latency tolerance levels.

20. The system defined in claim 15 wherein the server capability and preference information comprises one or more of connectivity of the server and server load changes.

21. The system defined in claim 15 wherein the replicable application service object comprises code, immutable data and mutable data.

22. The system defined in claim 21 wherein the code comprises class files that define Web-related application logic.

23. The system defined in claim 15 wherein the replicable application service object is a client replica.

24. The system defined in claim 15 wherein the replicable application service object is a server replica.

25. A computer-implemented method comprising:
selecting a client device for replication of a replicable application service object having executable code, based on capability and preference information of the client device and a server on which the replicable application service object resides;
populating the client device with client-specific data;
choosing an appropriate replica to serve a service request originally targeted for the server to enable execution of the replicable application service object by the client device; and
servicing the service request original targeted for the server by executing the replicable application service object by the client device.

26. The method defined in claim 25 further comprising: maintaining a desired state consistency among replicas.

27. The method defined in claim 25 further comprising:
intercepting the service request; and
determining if the client device currently allows replication.

28. A server comprising:
a network interface for use in communicating to one or more client devices;
a replication system having a preference interface; a capability interface; and a replication manager, the replication manager operable to
select a client device for replication of a replicable application service object having executable code, based on capability and preference information of the client device and a server, via the preference and capability interfaces, on which the replicable application service object resides,
populate the client device with client-specific data by sending the client-specific data via the network interface, and
choose an appropriate replica to serve a service request originally targeted for the server.

29. An article of manufacture having one or more computer readable storage media storing instructions thereon which, when executed by a system, cause the system to:
select a client device for replication of a replicable application service object having executable code, based on capability and preference information of the client device and a server on which the replicable application service object resides;
populate the client device with client-specific data;
choose an appropriate replica to serve a service request originally targeted for the server to enable execution of the replicable application service object by the client device; and
service the service request original targeted for the server by executing the replicable application service object by the client device.

* * * * *